United States Patent
Suzuki et al.

(10) Patent No.: US 11,307,358 B2
(45) Date of Patent: Apr. 19, 2022

(54) METHOD FOR MANUFACTURING OPTICAL COMPONENT AND PRESSING JIG

(71) Applicant: Sumitomo Electric Industries, Ltd., Osaka (JP)

(72) Inventors: Michio Suzuki, Osaka (JP); Tomoya Saeki, Osaka (JP); Yasushi Fujimura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/129,163

(22) Filed: Dec. 21, 2020

(65) Prior Publication Data

US 2021/0199893 A1  Jul. 1, 2021

(30) Foreign Application Priority Data

Dec. 27, 2019 (JP) .............................. JP2019-239510

(51) Int. Cl.
 *G02B 6/38* (2006.01)
(52) U.S. Cl.
 CPC ......... *G02B 6/3802* (2013.01); *G02B 6/3893* (2013.01); *G02B 6/3898* (2013.01)
(58) Field of Classification Search
 CPC .................................................. G02B 6/3802
 See application file for complete search history.

(56) References Cited

U.S. PATENT DOCUMENTS

| 5,588,080 A | 12/1996 | Kawamura | |
|---|---|---|---|
| 6,217,233 B1* | 4/2001 | Eslambolchi | G02B 6/3803 156/158 |
| 2014/0140668 A1* | 5/2014 | Morioka | G02B 6/2555 385/95 |
| 2019/0196118 A1* | 6/2019 | Shouda | G02B 6/4292 |
| 2021/0199893 A1* | 7/2021 | Suzuki | G02B 6/3893 |

FOREIGN PATENT DOCUMENTS

JP  H7-318755 A  12/1995

\* cited by examiner

*Primary Examiner* — Rhonda S Peace
(74) *Attorney, Agent, or Firm* — Baker Botts L.L.P.; Michael A. Sartori

(57) ABSTRACT

A method according to one embodiment includes steps of: preparing an optical module and optical fiber holding member; attaching a clip member to a receptacle of the optical module and the optical fiber holding member; and pressing the receptacle of the optical module and the optical fiber holding member from below and pressing the clip member from above. The pressing step has pressing the first flat surface of the receptacle and the second flat surface of the optical fiber holding member at the third flat surface of the clip member, and which performed until the first flat surface of the receptacle and the second flat surface of the optical fiber holding member establish parallelism with the third flat surface of the clip member by using a jig that changes the parallelism of the pressing surface.

6 Claims, 18 Drawing Sheets

METHOD FOR MANUFACTURING OPTICAL COMPONENT AND PRESSING JIG

CROSS REFERENCE TO RELATED APPLICATIONS

The present application claims priority based on Japanese Patent Application No. 2019-239510, which is filed on Dec. 27, 2019, the entire content disclosed in the aforementioned Japanese patent applications being incorporated herein by reference.

TECHNICAL FIELD

The present disclosure relates to a method for manufacturing an optical component and a pressing jig.

BACKGROUND

Japanese Unexamined Patent Publication No. H7-318755 discloses an optical connector to which an optical fiber cable is connected. In the optical connector, a receptacle of an optical device contained on a printed board and a ferrule attached to a free end of the optical fiber are inserted into a sleeve with the receptacle and the ferrule butted against each other. In the optical connector, the receptacle of the optical device and the free end of the optical fiber are coupled to each other by a clip.

SUMMARY

As described above, in the optical connector, the receptacle of the optical device and the ferrule attached to the free end of the optical fiber are inserted into the sleeve with the receptacle and the ferrule butted against each other, and the receptacle of the optical device and the free end of the optical fiber are then coupled to each other by the clip. The clip includes a hook that is caught on the receptacle of the optical device and the optical fiber, and when the hook is caught on the receptacle of the optical device, the clip is attached to the receptacle of the optical device and the optical fiber.

When the hook is caught on to make the attachment as described above, it is necessary to open the hook wider than a distance between the receptacle of the optical device and the optical fiber when the hook is caught on. The clip is attached by a spring force applied by the openable hook; therefore, the clip may unintentionally come off at the time of attachment, for example, which makes the attachment of the clip difficult. The attachment of the clip may be made manually. Therefore, when the attachment is difficult as described above, the quality of attachment may vary among individuals. Furthermore, quality problems such as improper attachment may occur.

It is therefore an object of the present disclosure to provide a method for manufacturing an optical component and a pressing jig allowing standardization of an attachment work and an increase in quality of the attachment work.

A method for fabricating an optical module comprising: an optical module having a cylindrical receptacle that holds the first optical fiber and has a first flat surface parallel to the optical axis of the first optical fiber as an outer surface; an optical fiber holding member in a cylindrical shape, that holds a second optical fiber that is optically coupled to the first optical fiber and has a second flat surface parallel to the optical axis of the second optical fiber as an outer surface; and a clip member having a third flat surface in surface contact with the first flat surface and the second flat surface for aligning the first optical axis with the second optical axis. The clip member is configured to press the receptacle and the optical fiber holding member against each other. The method includes steps of: preparing the optical module and the optical fiber holding member; attaching the clip member to the receptacle of the optical module and the optical fiber holding member; and pressing the receptacle of the optical module and the optical fiber holding member from below and pressing the clip member from above. The pressing step has pressing the first flat surface of the receptacle and the second flat surface of the optical fiber holding member at the third flat surface of the clip member, and which performed until the first flat surface of the receptacle and the second flat surface of the optical fiber holding member establish parallelism with the third flat surface of the clip member by using a jig that changes the parallelism of the pressing surface.

A pressing jig includes a lower plate pressing a first flat surface of a receptacle and a second flat surface of an optical fiber holding member; a holding part includes a movable portion, contacted on a third flat surface of a clip member, that having the third flat surface contact with a fourth flat surface opposite to the first flat surface of the receptacle and a fifth flat surface opposite to the second flat surface of the optical fiber holding member; and a stopper that stops pressing by the pressing portion when the pressing pressure by the pressing portion exceeds a certain value.

The method for manufacturing an optical component and the pressing jig according to the present disclosure allow standardization of the attachment work and an increase in quality.

DETAILED DESCRIPTION

Description of Embodiment of Present Disclosure

Figure 1:
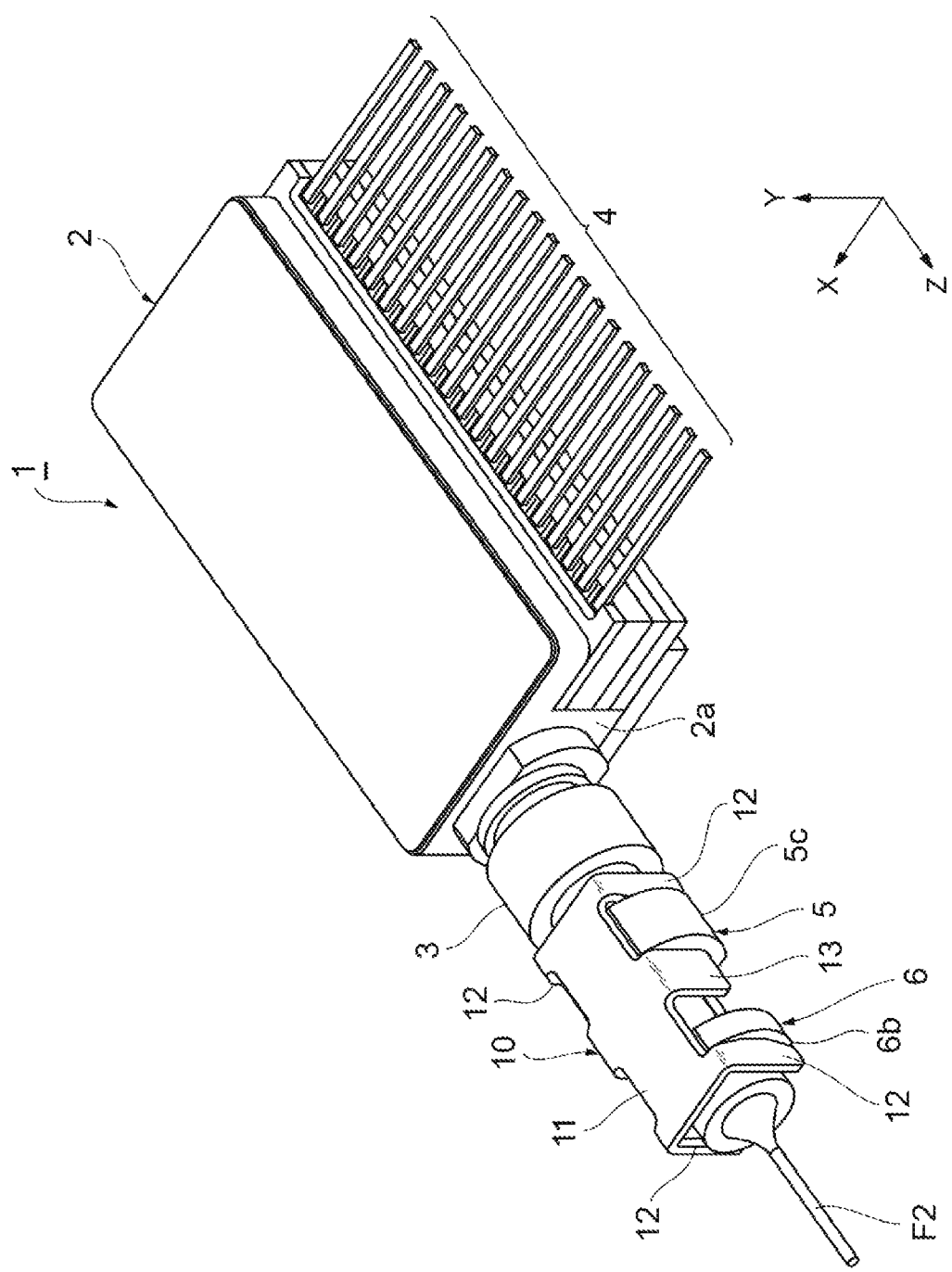
FIG. 1 is a perspective view of an optical module according to an embodiment.

First, a description will be given in series of the contents of an embodiment of the present disclosure. A method for manufacturing an optical component according to one embodiment, the optical component including an optical module including a receptacle having a cylindrical shape, the receptacle being configured to hold a first optical fiber and having a first flat surface as an outer surface parallel to an optical axis of the first optical fiber, an optical fiber holding member having a cylindrical shape, the optical fiber holding member being configured to hold a second optical fiber optically coupled to the first optical fiber and having a second flat surface as an outer surface parallel to an optical axis of the second optical fiber, and a clip member having a third flat surface configured to bring the first flat surface and the second flat surface into parallelism, the clip member being configured to apply pressure to both the receptacle and the optical fiber holding member, includes preparing the optical module and the optical fiber holding member, attaching the clip member to the receptacle of the optical module and the optical fiber holding member, and applying pressure to the receptacle of the optical module and the optical fiber holding member from below and applying pressure to the clip member from above. In the applying pressure, a jig allowing a pressing surface configured to apply pressure to the first flat surface of the receptacle and the second flat surface of the optical fiber holding member to change in parallelism is used to apply pressure until the third flat surface of the clip member brings the first flat surface of the receptacle and the second flat surface of the optical fiber holding member into parallelism.

Under this method for manufacturing an optical component, after attaching the clip member to the receptacle of the optical module and the optical fiber holding member, pressure is applied to the receptacle of the optical module and the optical fiber holding member from below. This pressure application is made by using a jig allowing the pressing surface that applies pressure to the first flat surface of the receptacle and the second flat surface of the optical fiber holding member to change in parallelism. The pressure applied by the jig presses the receptacle of the optical module and the optical fiber holding member from below and presses the clip member from above. The pressure application is made until the third flat surface of the clip member brings the first flat surface of the receptacle and the second flat surface of the optical fiber holding member into parallelism. Therefore, pressure is applied to the clip member that couples the receptacle of the optical module and the optical fiber holding member from above by the jig, and pressure is applied to the receptacle and the optical fiber holding member from below by the jig. As a result, the clip member can be rigidly attached to the receptacle and the optical fiber holding member by the jig in a simple manner, and a manufacturing tolerance of each component can be absorbed. Further, the application of pressure to the receptacle and the optical fiber holding member from below and to the clip member from above with the jig allows standardization of the attachment of the clip member through the thorough use of the jig. Therefore, it is possible to suppress variations in quality of attachment among individuals, which in turn allows standardization of the attachment work and an increase in quality of the attachment work.

A pressing jig according to one embodiment includes a lower plate configured to support an optical module including a receptacle having a cylindrical shape and an optical fiber holding member having a cylindrical shape, the receptacle being configured to hold a first optical fiber and having a first flat surface as an outer surface parallel to an optical axis of the first optical fiber, the optical fiber holding member being configured to hold a second optical fiber optically coupled to the first optical fiber and having a second flat surface as an outer surface parallel to an optical axis of the second optical fiber, a clip member having a third flat surface configured to bring the first flat surface and the second flat surface into parallelism, the clip member being configured to apply pressure to both the receptacle and the optical fiber holding member, a retainer movable and positioned over the clip member, and a stopper configured to stop the retainer from applying pressure when the pressure applied by the retainer becomes equal to or greater than a certain level.

This pressing jig includes a lower plate configured to apply pressure to the receptacle of the optical module and the optical fiber holding member from below, and a retainer configured to apply pressure to the clip member from above, and the retainer is movable. This allows pressure to be applied to the first flat surface of the receptacle and the second flat surface of the optical fiber holding member with the clip member by the movable retainer with the receptacle and the optical fiber holding member supported by the lower plate. This in turn allows the pressing jig to reliably and easily bring the first flat surface and the second flat surface into parallelism. The pressing jig further includes a stopper configured to stop the retainer from applying pressure when the pressure applied by the retainer becomes equal to or greater than the certain level. This stopper is capable of preventing the pressure applied by the retainer from exceeding the certain level; therefore, it is possible to suppress damage to each component when, for example, the clip member is attached.

Details of Embodiment of Present Disclosure

A description will be given of specific examples of the method for manufacturing an optical component and the pressing jig according to the present disclosure with reference to the drawings. It should be noted that the present invention is not limited to the following examples, and is intended to be defined by the claims and to include all modifications within the scope of the claims and their equivalents. In the following description, the same or equivalent components are denoted by the same reference numerals, and any redundant description will be omitted as appropriate. Further, the drawings may be simplified or exaggerated in part for ease of understanding, and dimensional ratios and the like are not limited to those described in the drawings.

Figure 2:
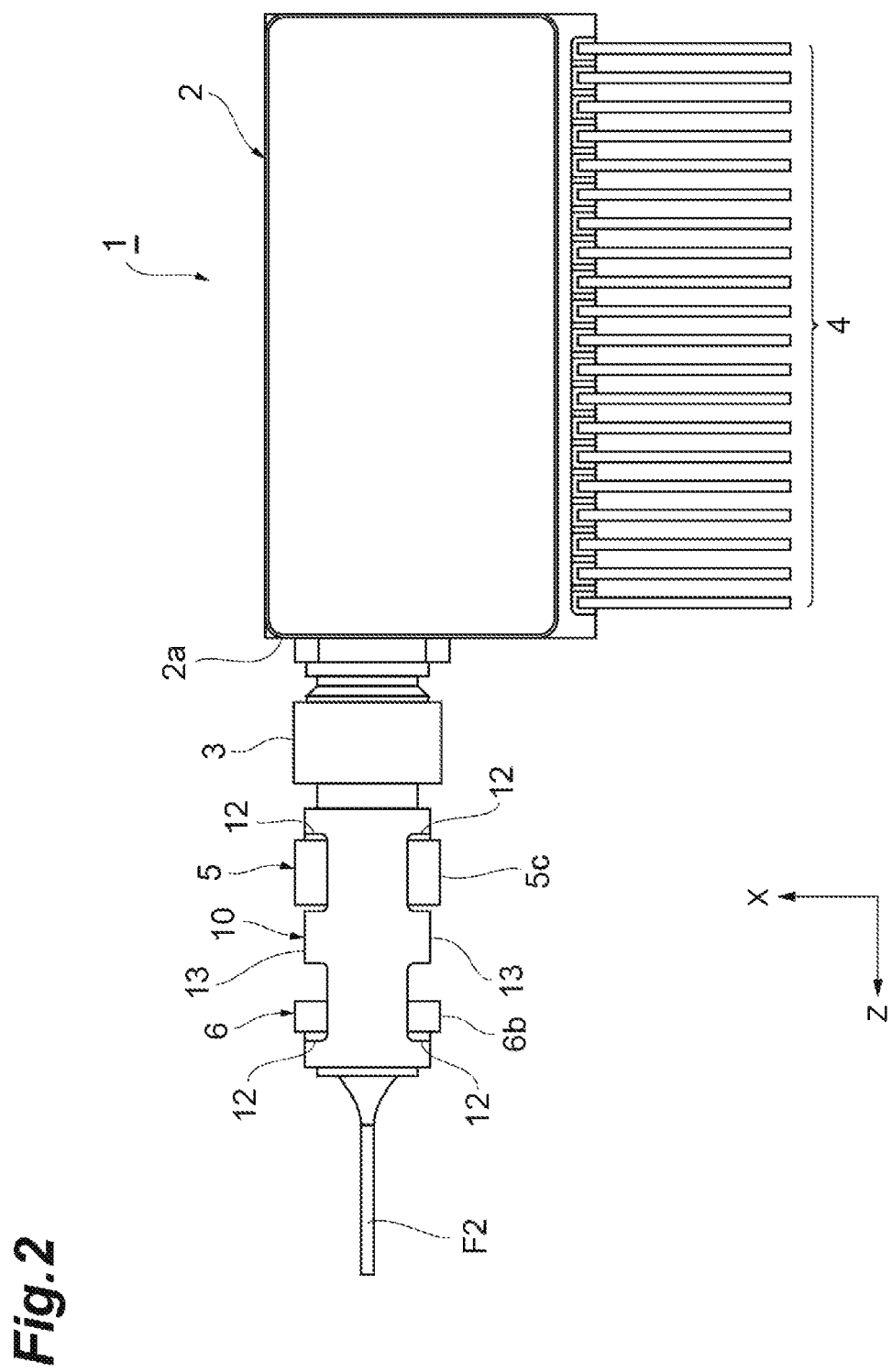
FIG. 2 is a plan view of the optical module shown in FIG. 1.

FIG. 1 is a perspective view of an optical module 1 including an optical component according to the present embodiment. FIG. 2 is a plan view of the optical module 1. Note that each drawing shows an XYZ orthogonal coordinate system for ease of understanding. For example, the optical module 1 is a coherent laser module, that is, a wavelength tunable laser, contained in an optical transceiver.

The optical module 1 includes a housing 2 having a cuboid shape and an optical fiber introduction portion 3 fixed to the housing 2. The housing 2 has four side walls. Of the four side walls of the housing 2, a side wall 2a having a window includes the optical fiber introduction portion 3 and a receptacle 5 having a cylindrical shape with a center axis extending in a Z direction. The optical fiber introduction portion 3 protrudes from the side wall 2a to the outside of the housing 2. The optical fiber introduction portion 3 has, for example, a cylindrical shape with the center axis extending in the Z direction.

Provided on at least one of the side walls other than the side wall 2a of the housing 2 are a plurality of terminals 4. The plurality of terminals 4 extends from, for example, multi-layered ceramics forming each side wall of the housing 2. The plurality of terminals 4 include a terminal for use in control of an oscillation wavelength from a semiconductor laser (LD), a terminal for use in temperature control, a terminal for use in an optical output monitor, and the like.

Figure 3:
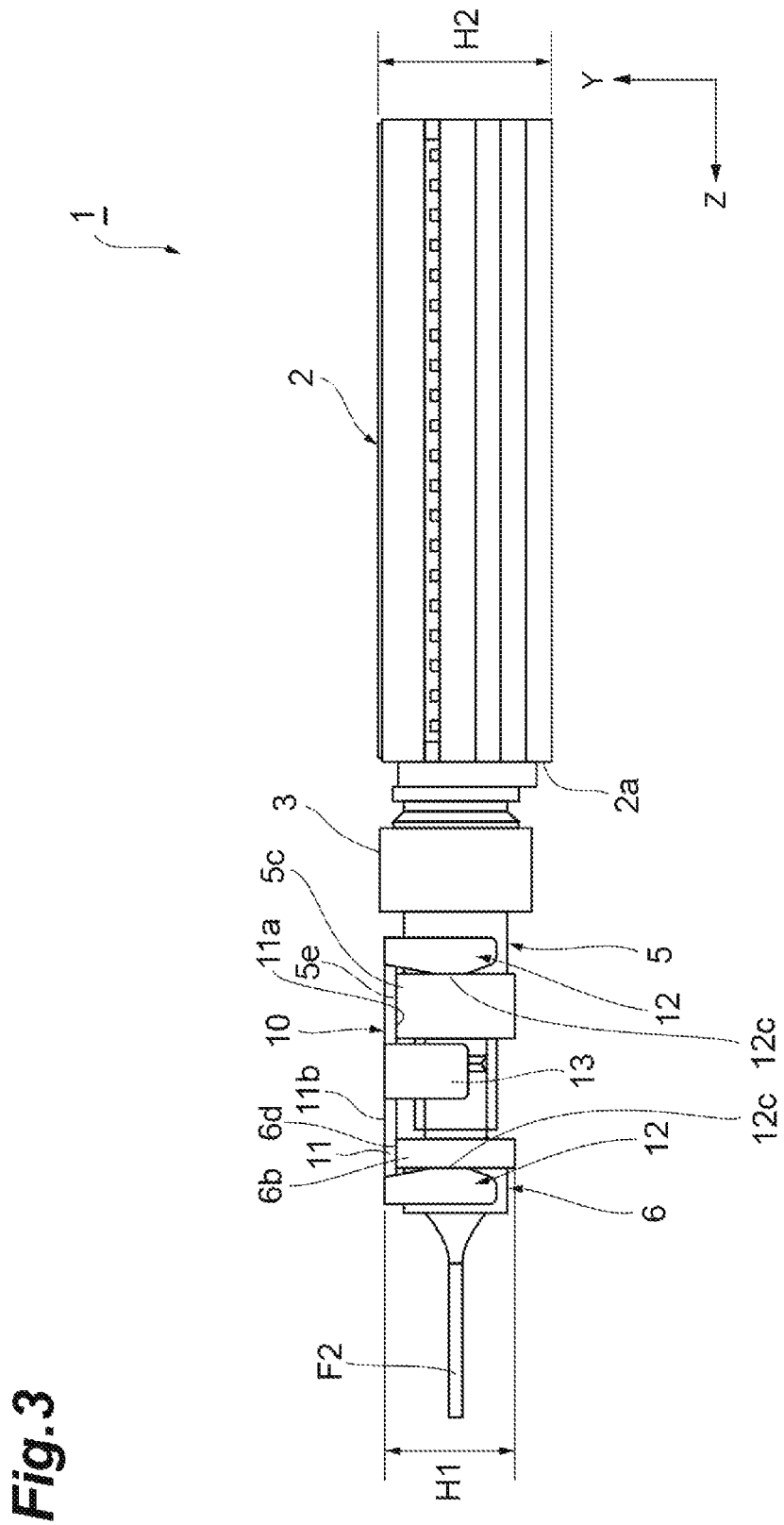
FIG. 3 is a side view of the optical module shown in FIG. 1.

FIG. 3 is a side view of the optical module 1 including the housing 2 and the optical fiber introduction portion 3. The optical module 1 includes the receptacle 5 provided in the optical fiber introduction portion 3, a plug 6 (optical fiber holding member) coupled to the receptacle 5, and a clip member 10 that holds the receptacle 5 and the plug 6 with the receptacle 5 and the plug 6 coupled to each other. The optical component according to the present embodiment includes the receptacle 5, the plug 6, and the clip member 10. As shown in FIG. 3, a thickness H1 (height in a Y direction) of the receptacle 5, the plug 6, and the clip member 10 is made less than a thickness H2 of the housing 2.

Figure 4:
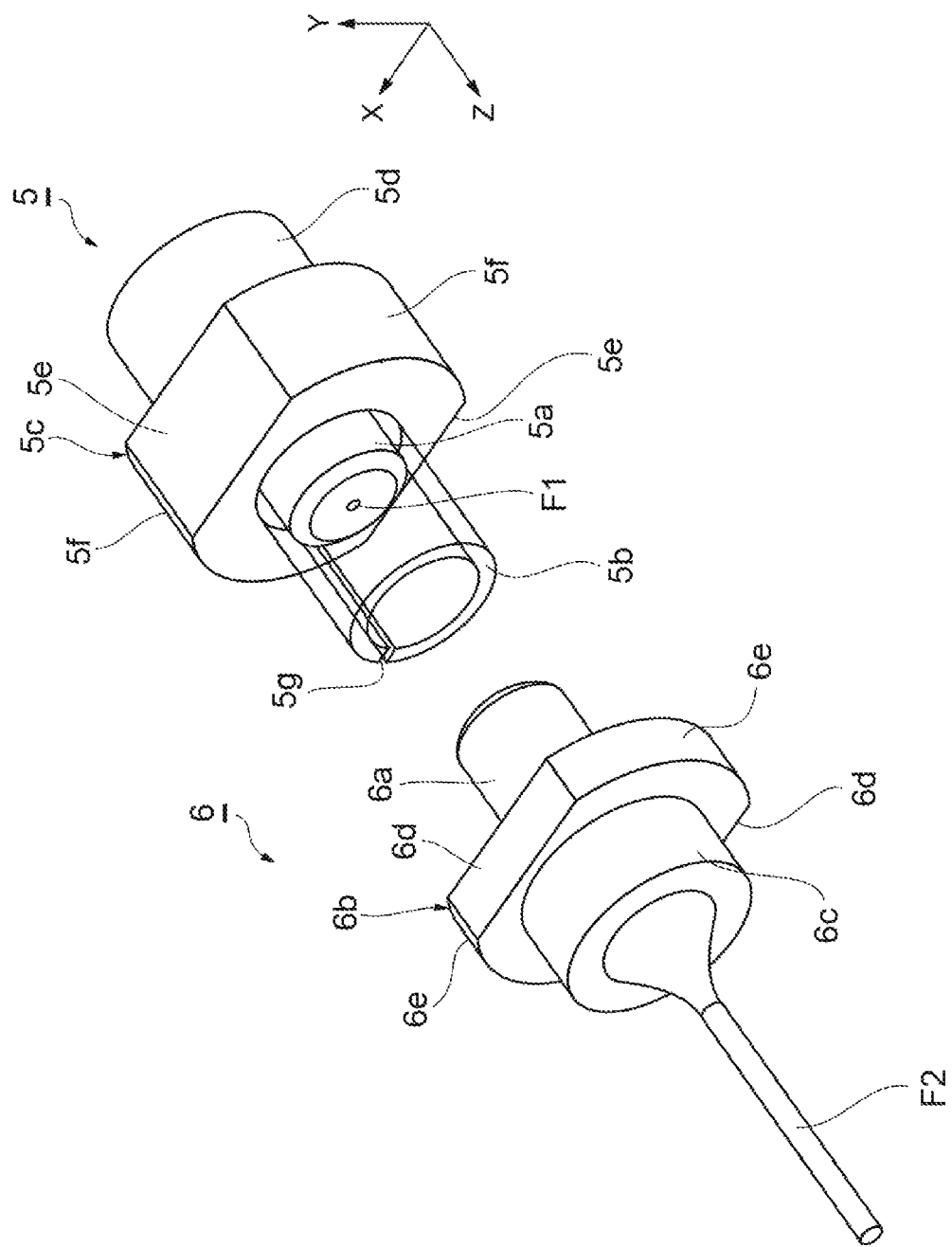
FIG. 4 is a perspective view of a receptacle and an optical fiber holding member of the optical module shown in FIG. 1.

FIG. 4 is a perspective view of the receptacle 5 and the plug 6. As shown in FIG. 4, the receptacle 5 includes a stub 5a that holds an optical fiber F1 (first optical fiber), a metal holder that houses the stub 5a and includes a flange 5c (first cylindrical flange), and a sleeve 5b that has a cylindrical shape and is attached to the stub 5a. Further, the metal holder including the flange 5c is provided with a cylindrical portion 5d. Note that, in FIG. 4, the stub 5a and the like housed in the sleeve 5b are shown by solid lines in order to make the illustration easy to understand. The optical fiber F1 is, for example, a polarization maintaining fiber (PMF). The sleeve 5b is, for example, a split sleeve having a cylindrical shape and including a slit 5g extending from an end face of the sleeve 5b in an axial direction.

The flange 5c is made larger in diameter than the sleeve 5b and the cylindrical portion 5d. The flange 5c is made of, for example, stainless steel. An outer surface of the flange 5c includes a pair of flat surfaces 5e (first flat surface) oriented in the Y direction and a pair of curved surfaces 5f (outer surface) curved in an arc between the pair of flat surfaces 5e. The flat surfaces 5e have a flat shape that results from cutting the flange 5c extending in a circular shape. That is, each flat surface 5e is, for example, a surface that results from D-cutting the flange 5c. Providing the pair of flat surfaces 5e arranged along the Y direction makes it possible to reduce the height of the receptacle 5 in the Y direction.

Figure 5:
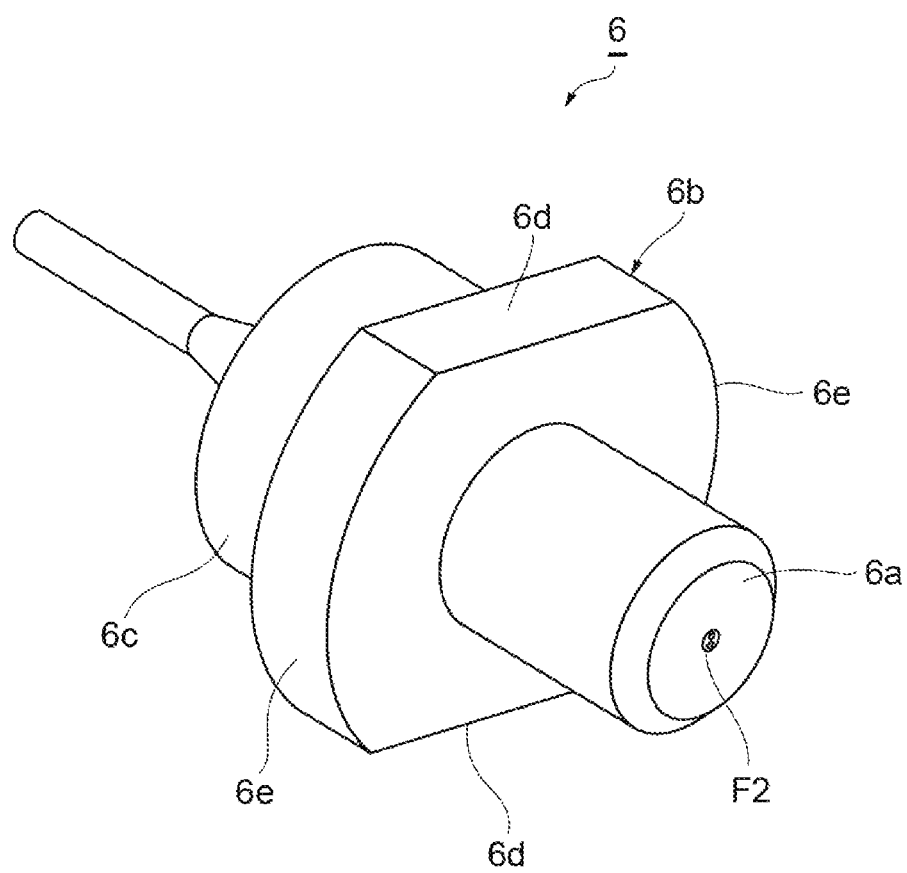
FIG. 5 is a perspective view of the optical fiber holding member.

FIG. 5 is a perspective view of the plug 6 as viewed from a direction different from the direction in FIG. 4. As shown in FIGS. 4 and 5, the plug 6 includes a stub 6a that holds an optical fiber F2 (second optical fiber) and a flange 6b (second cylindrical flange) extending outward from the stub 6a. The flange 6b includes a cylindrical portion 6c. The flange 6b is made of, for example, stainless steel. The cylindrical portion 6c is almost identical in diameter to, for example, the cylindrical portion 5d. The optical fiber F2 extends from the cylindrical portion 6c to the outside of the plug 6.

Figure 6:
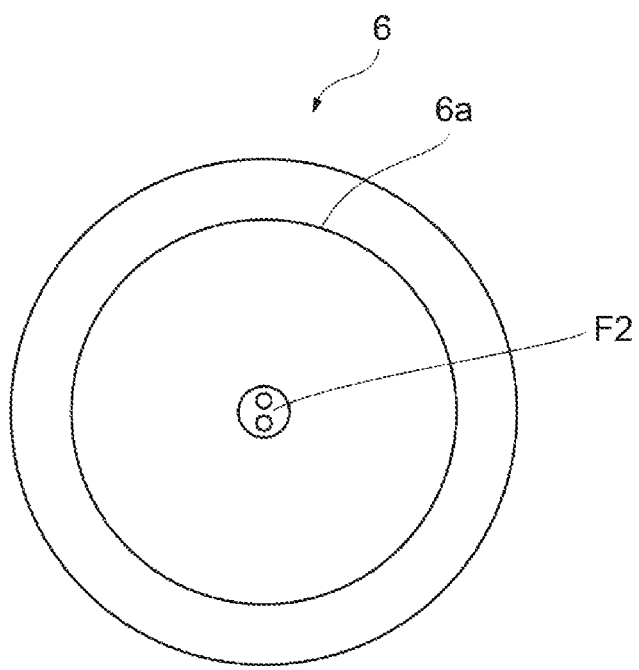
FIG. 6 is a front view of the optical fiber holding member and a polarization maintaining fiber shown in FIG. 5.

FIG. 6 is a front view of the optical fiber F2 and the stub 6a that holds the optical fiber F2. As shown in FIGS. 4, 5, and 6, the optical fiber F2 is, for example, a polarization maintaining fiber. Inserting the stub 6a into the sleeve 5b to connect the optical fiber F2 and the optical fiber F1 causes the plug 6 to be optically coupled to the receptacle 5.

The flange 6b is made larger in diameter than the stub 6a and the cylindrical portion 6c. An outer surface of the flange 6b includes a pair of flat surfaces 6d (second flat surface) oriented in the Y direction and a pair of curved surfaces 6e (outer surface) curved in an arc between the pair of flat surfaces 6d. The flat surfaces 6d have a flat shape that results from D-cutting the flange 6b extending in a circular shape. Providing the pair of flat surfaces 6d arranged along the Y direction makes it possible to reduce the height of the plug 6 in the Y direction. For example, a distance between the pair of flat surfaces 6d of the flange 6b (height of the plug 6 in the Y direction) is almost equal to a distance between the pair of flat surfaces 5e of the flange 5c (height of the receptacle 5 in the Y direction).

Figure 7A:
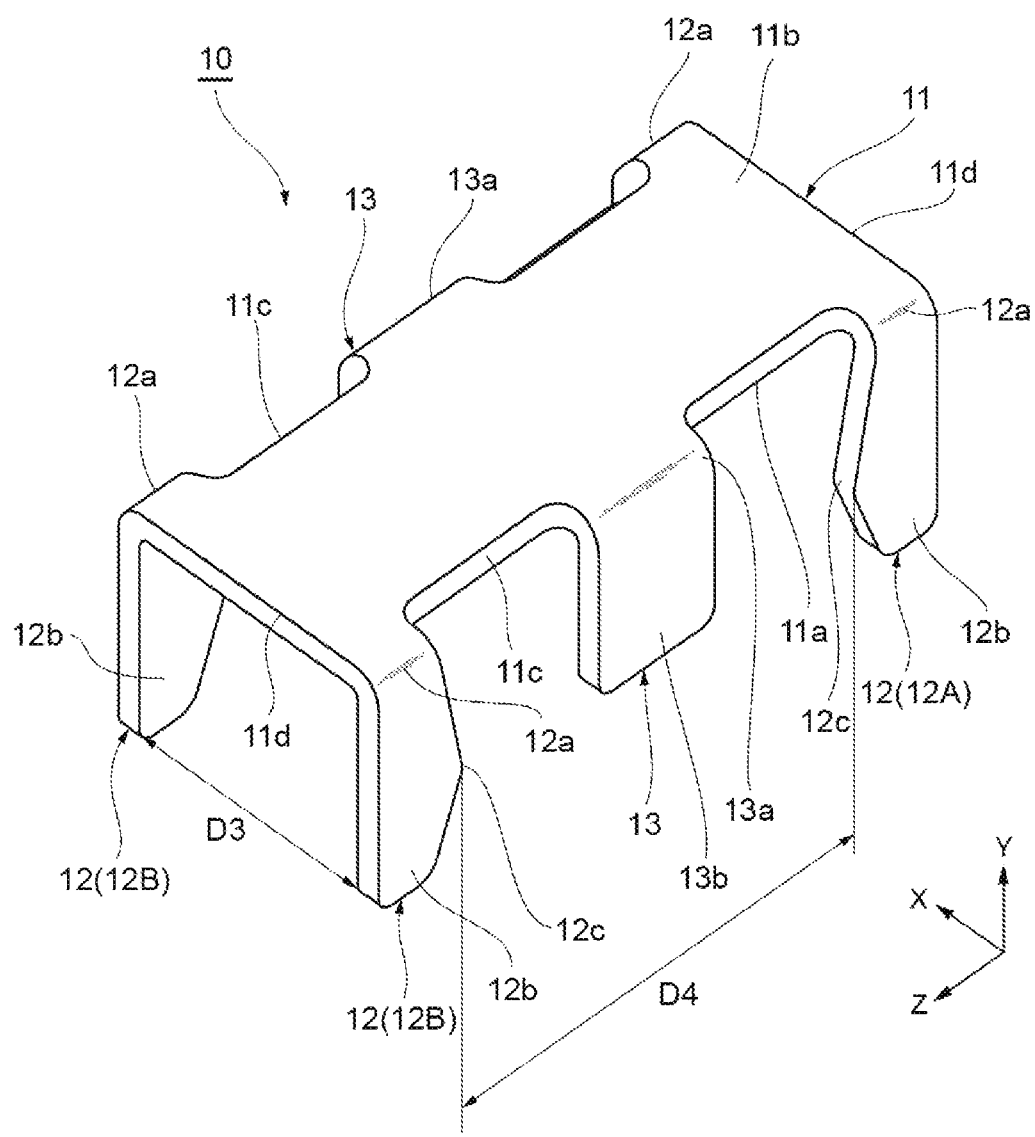
FIG. 7A is a perspective view of a clip member of the optical module shown in FIG. 1.
Figure 7B:
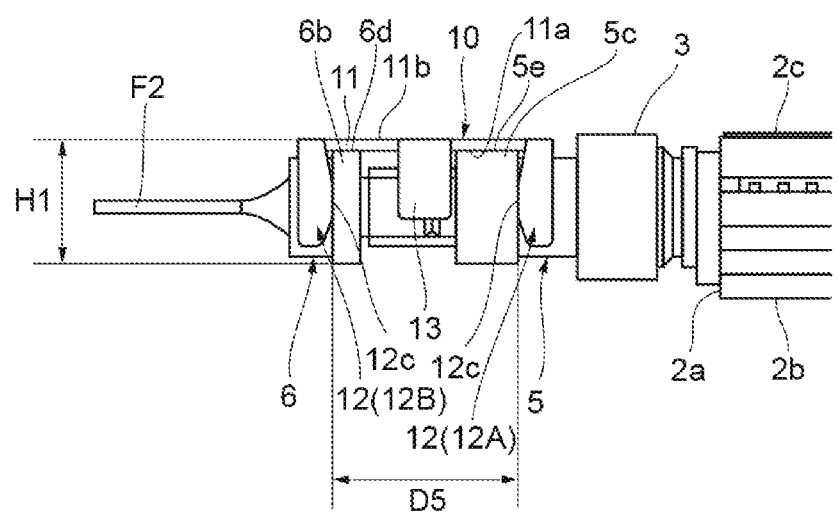
FIG. 7B is an enlarged side view surroundings of the clip member of the optical module shown in FIG. 1.

FIG. 7A is a perspective view of the clip member 10. FIG. 7B is an enlarged side view of a structure in the vicinity of the clip member 10. As shown in FIGS. 7A and 7B, the clip member 10 includes a plate-shaped portion 11 including a contact surface 11a having a flat shape (third flat surface) that comes into contact with the flat surface 5e of the receptacle 5 and the flat surface 6d of the plug 6, a retainer 12 extending from the plate-shaped portion 11 in an out-of-plane direction of the plate-shaped portion 11, and a protrusion 13 that is located between a plurality of the retainers 12 and protrudes from the plate-shaped portion 11 in the out-of-plane direction of the plate-shaped portion 11.

The plate-shaped portion 11 has, for example, a flat plate shape. The plate-shaped portion 11 includes the above-described contact surface 11a and an outer surface 11b on an opposite side of the plate-shaped portion 11 from the contact surface 11a. The clip member 10 holds the receptacle 5 and the plug 6 with the contact surface 11a in surface contact with the flat surface 5e and the flat surface 6d. That is, the contact surface 11a brings the flat surface 5e and the flat surface 6d into parallelism. The clip member 10 brings the contact surface 11a into surface contact with the flat surface 5e and the flat surface 6d to match a rotation angle about the optical fiber F1 with a rotation angle the optical fiber F2. The outer surface 11b has a flat shape as with the contact surface 11a. The plate-shaped portion 11 has, for example, a rectangular shape extending in the Z direction and the X direction, and includes a pair of long sides 11c extending in the Z direction and a pair of short sides 11d extending in the X direction. On both ends of each of the long sides 11c in the Z direction, the retainers 12 bent in the Y direction are provided. Note that the flat surface 5e and the flat surface 6d need not come into surface contact. That is, it is sufficient that the rotation angle about the optical fiber F1 and the rotation angle about the optical fiber F2 match with each other and that the flat surface 5e and the flat surface 6d be brought into parallelism. Note that it is sufficient that, for this parallelism, a difference between the rotation angles be within a range of, for example, ±5°. For example, when a distance between the flat surface 5e and the flat surface 6d, and the contact surface 11a is equal to or less than 10 µm, the parallelism can be maintained.

The clip member 10 includes the plurality of retainers 12, and the plurality of retainers 12 are each provided at, for example, a corresponding one of four corners of the plate-shaped portion 11. A distance D3 between the pair of retainers 12 arranged along the X direction is, for example, almost equal to an outer diameter of the cylindrical portion 5d and an outer diameter of the cylindrical portion 6c. The retainers 12 each include a curved surface 12a curved from the plate-shaped portion 11 and a plate-shaped portion 12b extending from the curved surface 12a in the Y direction. The plate-shaped portion 12b has, for example, a flat plate shape. The plate-shaped portion 12b includes a raised portion 12c protruding toward the inside of the clip member 10 in the Z direction. Further, the clip member 10 is made of a material containing stainless steel or a material containing copper. Both the material containing stainless steel and the material containing copper are high in rigidity, so that even a thin plate can produce a high spring force. Note that the clip member 10 may be made of a resin material. Such a resin material can produce a high spring force.

The raised portion 12c protrudes in a V shape in the plate-shaped portion 12b, for example. Note that it is possible to change the shape of the raised portion 12c as needed. The raised portion 12c is a portion that comes into contact with the flange 5c of the receptacle 5 or the flange 6b of the plug 6. A plurality of the raised portions 12c each apply pressure in a coupling direction in which the flange 5c and the flange 6b are coupled to each other (a direction in which the receptacle 5 and the plug 6 come close to each other, that is, toward the center of the clip member 10 along the Z axis). The clip member 10 applies pressure to both the receptacle 5 and the plug 6. As described above, the retainers 12 each include the raised portion 12c, and the clip member 10 applies pressure to both the receptacle 5 and the plug 6, thereby making a strong connection between the receptacle 5 and the plug 6. Further, the retainers 12 include a first retainer 12A that presses the receptacle 5 toward the plug 6, and a second retainer 12B that presses the plug 6 toward the receptacle 5. A distance between the raised portions 12c of two retainers 12 facing each other is denoted by distance D4.

The protrusion 13 bent in the Y direction is provided extending from each of the centers of the long sides 11c in the Z direction. The clip member 10 includes a pair of the protrusions 13 arranged along the X direction, and each protrusion 13 is provided between the pair of retainers 12 arranged along the Z direction. The protrusions 13 each include a curved portion 13a curved from the plate-shaped portion 11, and a plate-shaped portion 13b extending from the curved portion 13a in the Y direction. The sleeve 5b of the receptacle 5 is interposed between a pair of the plate-shaped portions 13b.

As described above, in the optical component according to the present embodiment, the receptacle 5 includes the flat surface 5e, and the plug 6 serving as the optical fiber holding member includes the flat surface 6d. The clip member 10 includes the contact surface 11a that comes into contact with the flat surface 5e and the flat surface 6d. The clip member 10 includes the first retainer 12A and the second retainer 12B that maintain a state where the plug 6 and the receptacle 5 are coupled to each other with the flat surface 5e and the flat surface 6d brought into parallelism by the contact surface 11a. The first retainer 12A presses the receptacle 5 toward the plug 6, and the second retainer 12B presses the plug 6 toward the receptacle 5. Therefore, holding the plug 6 and the receptacle 5 with the first retainer 12A and the second retainer 12B of the clip member 10 makes it possible to hold the plug 6 and the receptacle 5 with a simple structure.

Further, the first retainer 12A and the second retainer 12B apply pressure to the receptacle 5 and the plug 6, respectively, in a state where the flat surface 5e and the flat surface 6d are brought into parallelism by the contact surface 11a, allowing the clip member 10 small in size to reliably hold the receptacle 5 and the plug 6. Furthermore, bringing the flat surface 5e and the flat surface 6d into parallelism makes it possible to prevent the clip member 10, the receptacle 5, and the plug 6 from protruding from the housing 2. Therefore, the clip member 10, the receptacle 5, and the plug 6 can be reliably housed inside the optical transceiver. As a result, the optical module 1 can be reliably contained in a narrow space such as the inside of the optical transceiver.

Further, the optical fiber F2 held by the plug 6 is a PMF, and a slow axis or fast axis of the PMF is parallel to the contact surface 11a. Since the optical fiber F2 held by the plug 6 is a polarization maintaining fiber, holding the coupling between the plug 6 and the receptacle 5 with the clip member 10 allows the plug 6 to output an optical signal in a correct polarization state.

Further, the optical fiber F1 held by the receptacle 5 is a PMF, and a slow axis or fast axis of the PMF may be parallel to the contact surface 11a. In this case, since the optical fiber F1 held by the receptacle 5 is a polarization maintaining fiber, such use of the polarization maintaining fiber for the receptacle 5 can make the polarization characteristics more excellent. Further, the clip member 10 is attached (inserted) to bring the contact surface 11a into surface contact with the flat surface 5e and the flat surface 6d, so that a slight misalignment in the rotation direction that occurs when their respective stubs of the receptacle 5 and the plug 6 are connected to each other can be corrected, thereby allowing the polarization directions of the polarization maintaining fibers to match with each other. As described above, bringing the contact surface 11a of the clip member 10 into surface contact with the flat surface 5e and the flat surface 6d allows the flat surface 5e and the flat surface 6d to be flush with each other.

Further, the clip member 10 includes two retainers 12 facing each other along the coupling direction in which the plug 6 and the receptacle 5 are coupled to each other, and each of the retainers 12 applies pressure to a corresponding one of the flange 5c and the flange 6b in the coupling direction. Since the retainers 12 apply pressure to the receptacle 5 and the plug 6 along the coupling direction, the coupling between the receptacle 5 and the plug 6 can be made firmer.

Further, the retainers 12 each include the raised portion 12c that applies pressure to a corresponding one of the flange 5c and the flange 6b. Since the flange 5c and the flange 6b are each pressed by the raised portion 12c, the pressure applied to the flange 5c and the flange 6b can be further increased. This makes it possible to maintain the coupling between the plug 6 and the receptacle 5 more firmly.

A distance between the respective contact surfaces of the flange 5c and the flange 6b that are each in contact with a corresponding one of the retainers 12 is denoted by distance D5. In a state before the clip member 10 is attached to the flange 5c and the flange 6b, the distance D4 between two retainers 12 facing each other is less than the distance D5 between the respective contact surfaces of the flange 5c and the flange 6b that are each in contact with a corresponding one of the retainers 12. Therefore, with the receptacle 5 and the plug 6 interposed between the pair of retainers 12, the pair of retainers 12 apply pressure to the flange 5c and the flange 6b. Since the flange 5c and the flange 6b are each pressed by a corresponding one of the retainers 12, the pressure applied to the flange 5c and the flange 6b can be further increased.

As shown in FIGS. 1 and 7B, the clip member 10 includes the plurality of retainers 12 facing each other in the coupling direction (Z direction) in which the plug 6 and the receptacle 5 are coupled to each other and in an orthogonal direction (X direction) orthogonal to the coupling direction, and the plurality of retainers 12 apply pressure to a pair of portions of the flange 5c arranged in the X direction and a pair of portions of the flange 6b arranged in the X direction. Since the flange 5c and the flange 6b can be pressed in both the Z direction and the X direction, the pressure applied to the flange 5c and the flange 6b can be further increased. This makes it possible to maintain the coupling between the plug 6 and the receptacle 5 more firmly.

Further, the flange 5c and the flange 6b are made of a material containing stainless steel. The stainless steel material is high in durability and excellent in environmental resistance to, for example, high temperature or high humidity. This makes it possible to increase the durability and environmental resistance of the flange 5c and the flange 6b.

The optical module 1 according to the present embodiment further includes the housing 2 that includes the window on which the receptacle 5 is provided and in which an optical element is contained, the housing 2 includes a bottom surface 2b, the optical element processes light having a plane of polarization parallel or perpendicular to the bottom surface 2b, and the contact surface 11a is parallel to the bottom surface 2b. Further, in the optical module 1, the housing 2 includes a ceiling surface 2c facing the bottom surface 2b of the housing 2, the contact surface 11a is located between the bottom surface 2b and the ceiling surface 2c, and both a length from the flat surface 5e to an opposite end of the flange 5c of the receptacle 5 from the flat surface 5e (for example, a distance between the pair of flat surfaces 5e) and a length from the flat surface 6d to an opposite end of the flange 6b of the plug 6 from the flat surface 6d (for example, a distance between the pair of flat surfaces 6d) are less than a length from the bottom surface 2b of the housing 2 to the ceiling surface 2c of the housing 2. This can make the clip member 10, the plug 6, and the receptacle 5 more compact, and in turn allows the optical module 1 to be more reliably contained in a narrow space such as the inner space of the optical transceiver.

Figure 8:
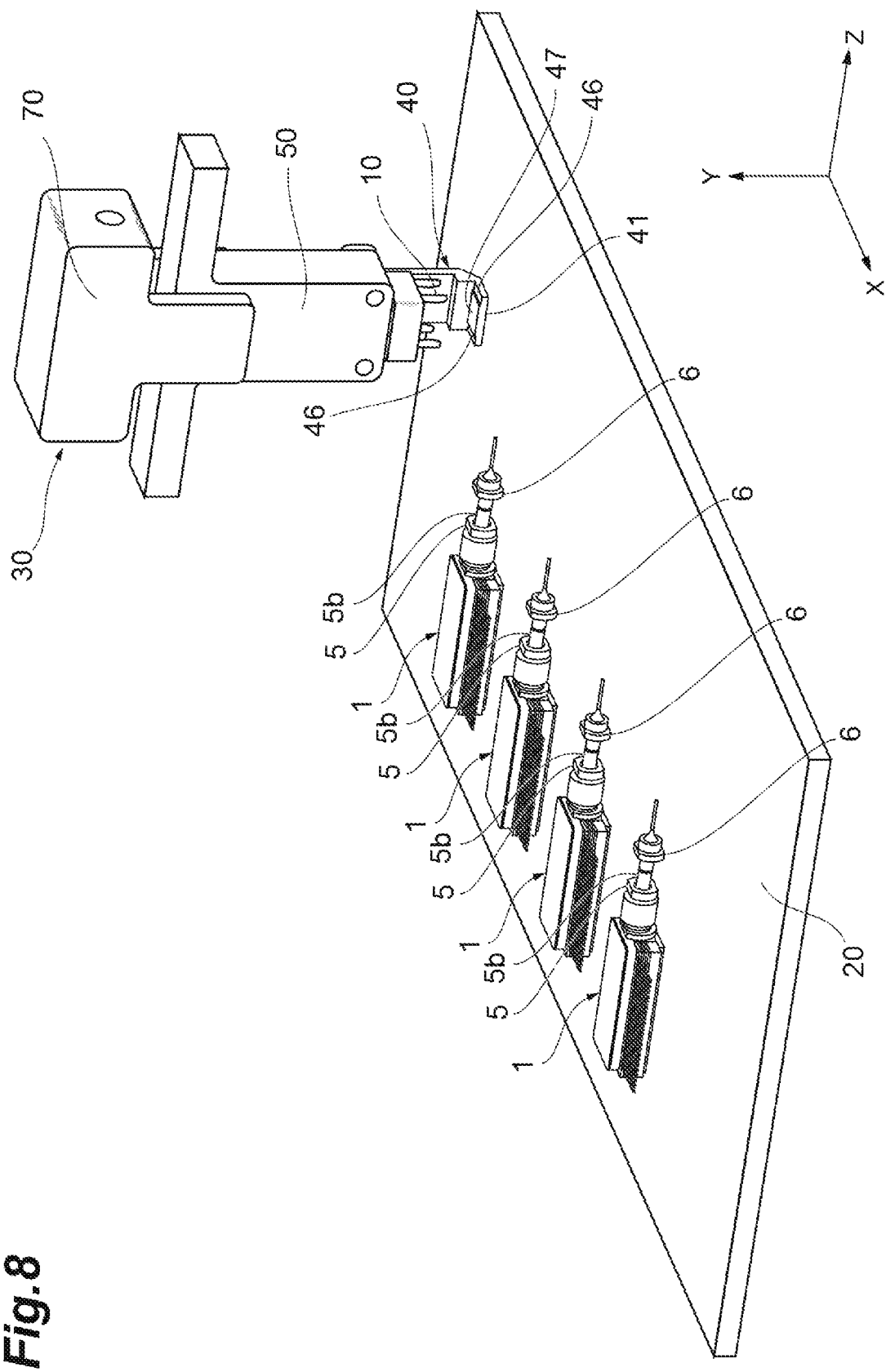
FIG. 8 is a schematic perspective view of the optical modules contained on a substrate and a pressing jig.

FIG. 8 is a perspective view of an example of the optical module 1 contained on a substrate 20. As shown in FIG. 8, the clip member 10 is attached to the optical module 1 by using a jig 30 that is a pressing jig that retains the plug 6 serving the optical fiber holding member and the receptacle 5. The jig 30 is, for example, a hand-held pressing jig that is used while being held by hand. The jig 30 is inserted into a space between the sleeve 5b of the receptacle 5 and the substrate 20 and attaches the clip member 10 to the receptacle 5 and the plug 6. For example, the substrate 20 extends in both the X direction and the Z direction, and a plurality of the optical modules 1 are arranged along the X direction on the substrate 20. For example, the jig 30 is inserted into the space between the sleeve 5b and the substrate 20 along the X direction and attaches the clip member 10.

Figure 9:
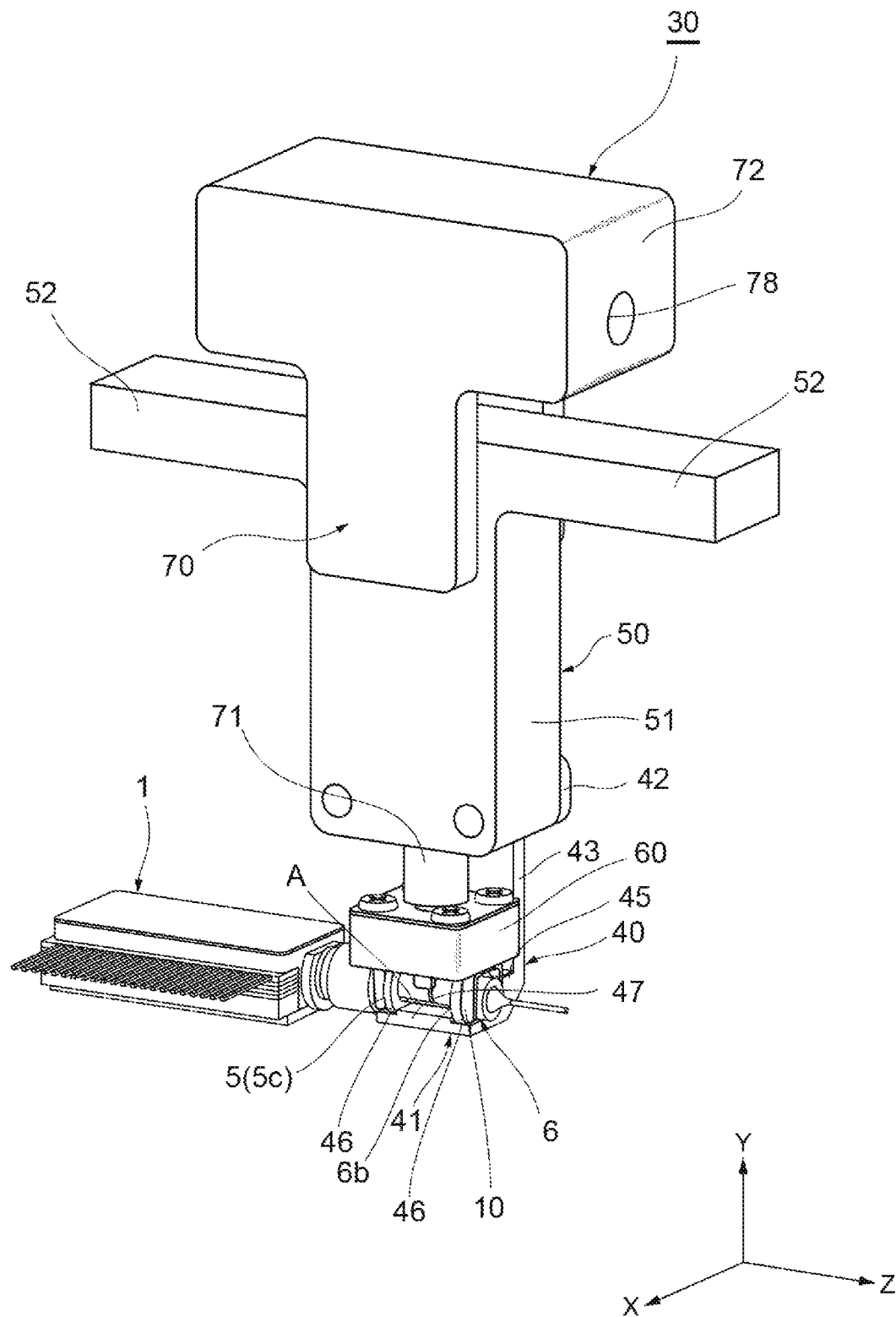
FIG. 9 is a perspective view of the pressing jig and the optical module shown in FIG. 8.

FIG. 9 is an enlarged perspective view of the optical module 1 and the jig 30. As shown in FIG. 9, the jig 30 includes a holding portion 40 including a lower plate 41 (lower board) that holds the receptacle 5 and the plug 6 placed on the lower plate 41, a body 50 located above the holding portion 40, a holding part 60 extending downward from the body 50 toward the lower plate 41, and a pressing head 70 that presses the holding part 60 downward.

The holding portion 40 includes, for example, a fixed portion 42 fixed to the body 50, a plate-shaped portion 43 extending downward from the fixed portion 42, and the above-described lower plate 41 extending from a lower end of the plate-shaped portion 43 in the X direction. For example, the fixed portion 42 has a shape extending in the Z direction at an upper end of the plate-shaped portion 43. Provided at a lower portion of the plate-shaped portion 43 is a step portion 45 facing a side surface of the clip member 10, and the lower plate 41 extends from a lower end of the step portion 45 in the X direction.

The lower plate 41 includes a pair of placement surfaces 46 (mounting side) on which the flange 5c (fourth flat surface) of the receptacle 5 and the flange 6b (fifth flat surface) of the plug 6 are placed, and a convex 47 that protrudes into a space A between the flange 5c and the flange 6b. The convex 47 protrudes in the Y direction and extends in the Z direction between the flange 5c and the flange 6b and is provided to make alignment of the flange 5c and the flange 6b. The convex 47 interposed between the flange 5c and the flange 6b can prevent the flange 5c and the flange 6b from coming too close to each other.

Figure 10:
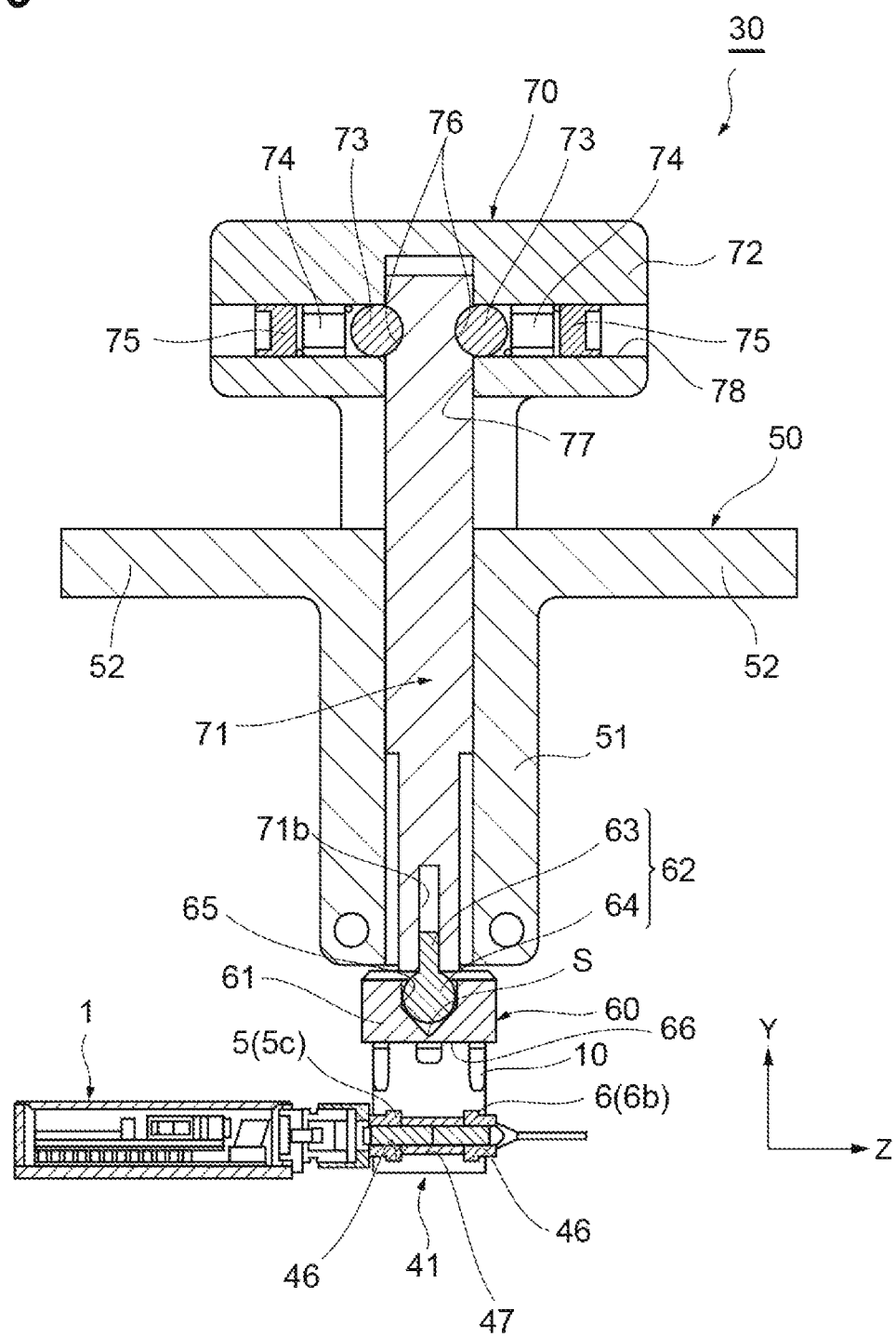
FIG. 10 is a vertical cross-sectional view of the pressing jig and the optical module shown in FIG. 9.

FIG. 10 is a vertical cross-sectional view of the jig 30 and the optical module 1. As shown in FIGS. 9 and 10, the body 50 includes a first portion 51 extending in the Y direction and a pair of second portions 52 extending toward both sides in the Z direction from an upper end of the first portion 51. The body 50 has, for example, a T-shape having the first portion 51 and the pair of second portions 52. For example, the second portions 52 extending from the first portion 51 toward both sides in the Z direction give the body 50 a shape that allows the body 50 to be easily held by hand.

The pressing head 70 is a portion that presses the holding part 60 downward. The holding part 60 is pressed by the pressing head 70 to apply downward-pressure to the clip member 10. The pressing head 70 includes a pressing rod 71 that vertically extends through the body 50 and extends upward from the holding part 60, a housing 72 that houses an upper portion of the pressing rod 71 and is located above the body 50, a ball 73 that is in contact with the pressing rod 71 inside the housing 72, a spring 74 located on the opposite side of the ball 73 from the pressing rod 71, and a support portion 75 that supports the spring 74 on the opposite side of the ball 73.

The pressing rod 71 includes a dent 76 at the upper portion of the pressing rod 71, and the ball 73 fits into the dent 76. The ball 73 is, for example, a steel ball. The dent 76 and the ball 73 are provided on both sides of the pressing rod 71 in the Z direction, for example. The dent 76 curves inward on the surface of the pressing rod 71. While the pressing head 70 is not pressing the holding part 60, the ball 73 fits in and engages with the dent 76, and when the pressing head 70 presses the holding part 60 at pressure of a certain level or greater, the dent 76 moves upward relative to the ball 73 to cause the ball 73 to disengage from the dent 76.

Therefore, when the pressure applied by the holding part 60 to the clip member 10 become equal to or greater than the certain level, the ball 73 disengages from the dent 76, stopping the holding part 60 from applying pressure to the clip member 10. As described above, the ball 73 and the dent 76 of the pressing rod 71 form a latch mechanism for engagement and disengagement and also serve as a stopper that stops the pressure application when the pressure exceeds the certain level.

The spring 74 is, for example, a helical compression spring. The spring 74 is provided for each of the pair of balls 73 and pushes the ball 73 toward the dent 76. The ball 73 is supported by one end of the spring 74, and the support portion 75 is provided adjacent to the other end of the spring 74. For example, the pressing rod 71 is housed in a first inner space 77 of the housing 72 extending in the Y direction, and the ball 73, the spring 74, and the support portion 75 are housed in a second inner space 78 of the housing 72 extending in the Z direction. An end of the second inner space 78 in the Z-direction is open to the outside of the housing 72, for example. The support portion 75 is, for example, a set screw fixed to the second inner space 78.

Figure 11:
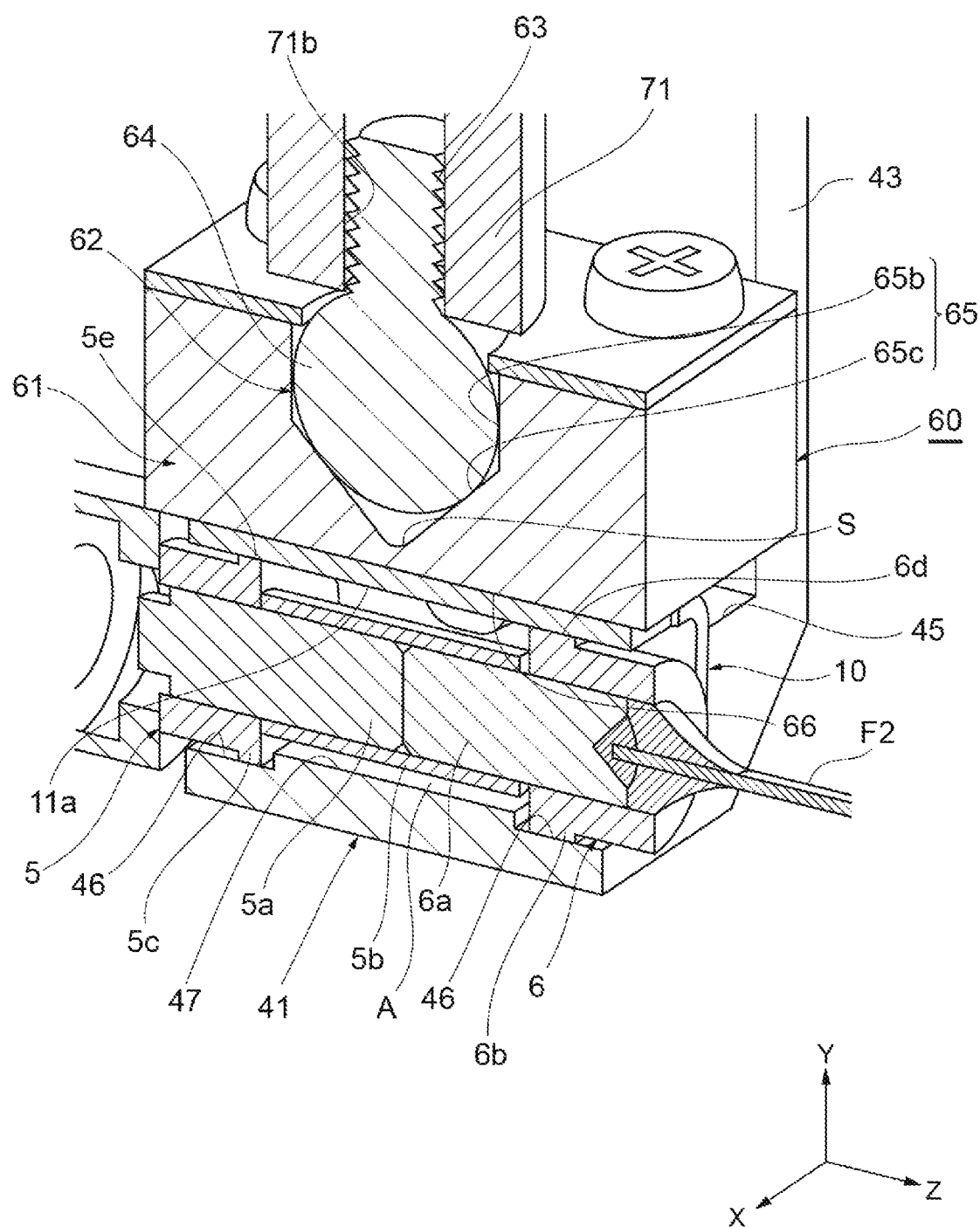
FIG. 11 is a perspective cross-sectional view of a base and a support portion of a movable retainer of the pressing jig shown in FIG. 10.

FIG. 11 is an enlarged perspective cross-sectional view of the holding part 60. As shown in FIGS. 10 and 11, the holding part 60 includes a base 61 (pedestal) having a cavity S and a support portion 62 (movable portion) movable within the cavity S. The support portion 62 includes, for example, male threads 63 coupled to a lower portion of the pressing rod 71, and a spherical portion 64 that extends from a lower end of the male threads 63 and is located in the cavity S of the base 61. The male threads 63 are fixed with the male threads 63 located in a hole 71b extending upward from a lower end of the pressing rod 71.

The base 61 has, for example, a cuboid shape extending in the X direction, the Y direction, and the Z direction. A lower surface 66 (a surface facing the clip member 10) of the base 61 serves as a pressing surface that applies pressure to the clip member 10. The spherical portion 64 is located in a depressed portion 65 that curves downward in the base 61. For example, the depressed portion 65 is defined by a first inner peripheral surface 65b that forms a cylindrical shape and a second inner peripheral surface 65c that forms a conical shape that gradually reduces in diameter from a lower end of the first inner peripheral surface 65b.

For example, the cavity S is formed between the spherical portion 64 and a lower portion of the second inner peripheral surface 65c. The base 61 is tiltable in both the X direction and the Z direction relative to the spherical portion 64. For example, the spherical portion 64 slides along the first inner peripheral surface 65b and the second inner peripheral surface 65c. This makes a structure that makes the holding part 60 (base 61) movable at the lower end of the pressing head 70. That is, a structure allowing the pressing surface of the holding part 60 (the lower surface 66 of the base 61) that applies pressure to the clip member 10 to change in parallelism is made.

Figure 12:
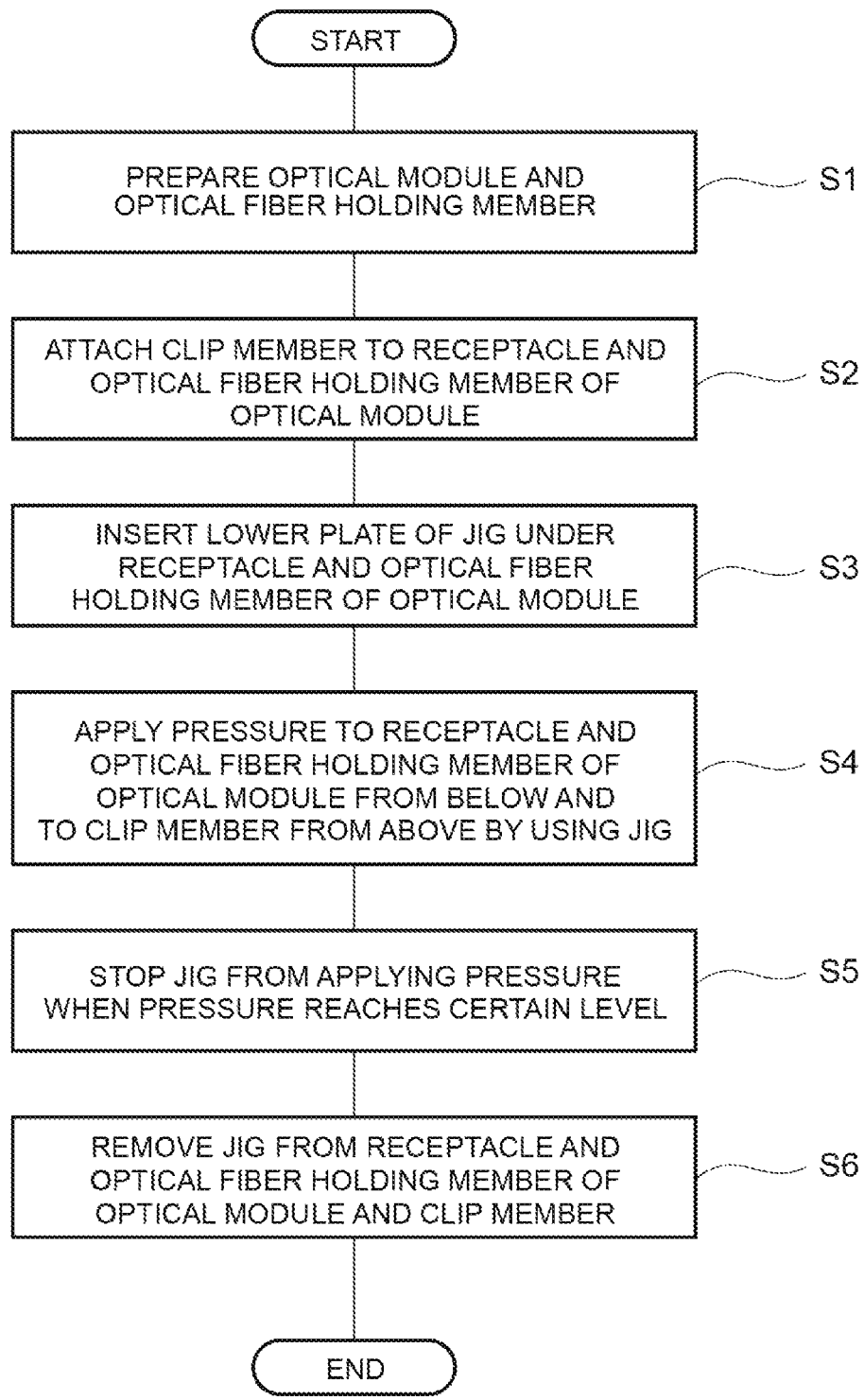
FIG. 12 is a flowchart showing a process example of a method for manufacturing an optical component according to an embodiment.

A description will be given below of a specific example of a method for manufacturing an optical component according to the present embodiment with reference to a flowchart shown in FIG. 12. FIG. 12 is a flowchart showing a process example of a method for attaching the clip member 10 to the receptacle 5 and the plug 6 of the optical module 1. First, the optical module 1 and the plug 6 serving as the optical fiber holding member are prepared (preparation process, step S1). At this time, for example, as shown in FIG. 4, the plug 6 is placed facing the receptacle 5 along the Z direction, the stub 6a of the plug 6 is inserted into the sleeve 5b to couple the plug 6 to the receptacle 5.

Next, the clip member 10 is attached to the receptacle 5 and the plug 6 of the optical module 1 (process of attaching the clip member, step S2). For example, as shown in FIGS. 7A and 7B, the clip member 10 is prepared, and the clip member 10 is attached to the flange 5c of the receptacle 5 and the flange 6b of the plug 6 from above (in the Y direction). Then, as shown in FIGS. 8 and 9, the lower plate 41 of the jig 30 is inserted under the receptacle 5 and the plug 6 of the optical module 1 contained on the substrate 20 (process of inserting the jig, Step S3). At this time, the flange 5c of the receptacle 5 is placed on one of the placement surfaces 46 of the lower plate 41, and the flange 6b of the plug 6 is placed on the other placement surface 46 of the lower plate 41, causing the convex 47 to be interposed between the flange 5c and the flange 6b.

After inserting the lower plate 41 under the receptacle 5 and the plug 6 as described above, the lower plate 41 supports the flange 5c of the receptacle 5 and the flange 6b of the plug 6, and the holding part 60 applies downward-pressure to the clip member 10 (process of applying pressure, step S4). At this time, the lower plate 41 applies pressure to the receptacle 5 and the plug 6 from below, and the holding part 60 applies pressure to the clip member 10 from above.

The holding part 60 applies pressure to the clip member 10 until the pressure reaches a certain level, and when the pressure reaches the certain level, the holding part 60 is stopped from applying pressure (process of stopping the pressure application, step S5). The certain level is used for the contact surface 11a (third flat surface) of the clip member 10 to bring the flat surface 5e (first flat surface) of the receptacle 5 and the flat surface 6d (second flat surface) of the plug 6 into parallelism. The constant level is, for example, 3.0 kgf.

For example, when the pressure is less than the certain level, the ball 73 engages with the dent 76 as shown in FIGS. 10 and 11, thereby causing the pressing rod 71 and the holding part 60 to keep applying pressure to the clip member 10 from above. However, when the pressure becomes greater, the contact surface 11a of the clip member 10 brings the flat surface 5e of the receptacle 5 and the flat surface 6d of the plug 6 into parallelism. Then, when the pressure becomes equal to or greater than the certain level, the dent 76 moves upward relative to the ball 73 to release the engagement (latching) of the ball 73 with the dent 76, thereby causing the holding part 60 to stop from applying pressure to the clip member 10. Subsequently, the jig 30 is removed from the receptacle 5 and the plug 6 of the optical module 1 (process of removing the jig, step S6), which brings the series of processes to an end.

A description will be given below of actions and effects obtained by the method for manufacturing an optical component and the pressing jig (jig 30) according to the present embodiment. Under the method for manufacturing an optical component, pressure is applied to the receptacle 5 and the plug 6 of the optical module 1 from below. This pressure application is made by using the jig 30 allowing the lower surface 66 that applies pressure to the flat surface 5e of the receptacle 5 and the flat surface 6d of the plug 6 to change in parallelism. The pressure applied by the jig 30 presses the receptacle 5 and the plug 6 of the optical module 1 from below and presses the clip member 10 from above. The pressure is applied until the contact surface 11a of the clip member 10 brings the flat surface 5e of the receptacle 5 and the flat surface 6d of the plug 6 into parallelism.

Therefore, pressure is applied to the clip member 10 that couples the receptacle 5 and the plug 6 of the optical module 1 from above by the jig 30, and pressure is applied to the receptacle 5 and the plug 6 from below by the jig 30. As a result, the clip member 10 can be rigidly attached to the receptacle 5 and the plug 6 by the jig 30 in a simple manner, and a manufacturing tolerance of each component can be absorbed.

Figure 13:
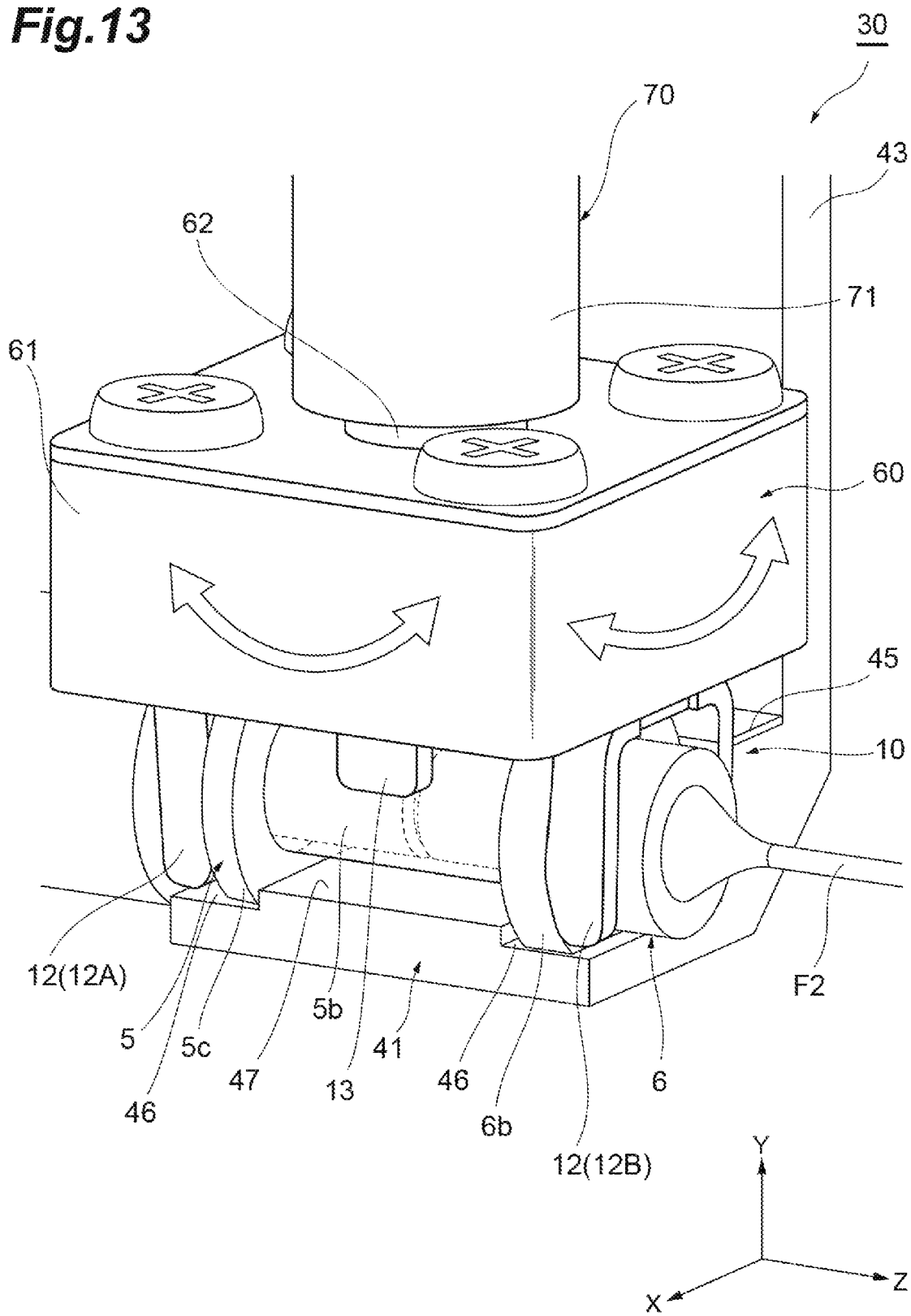
FIG. 13 is a perspective view of the movable retainer, the receptacle of the optical module, the optical fiber holding member, and the clip member shown in FIG. 11.
Figure 14:
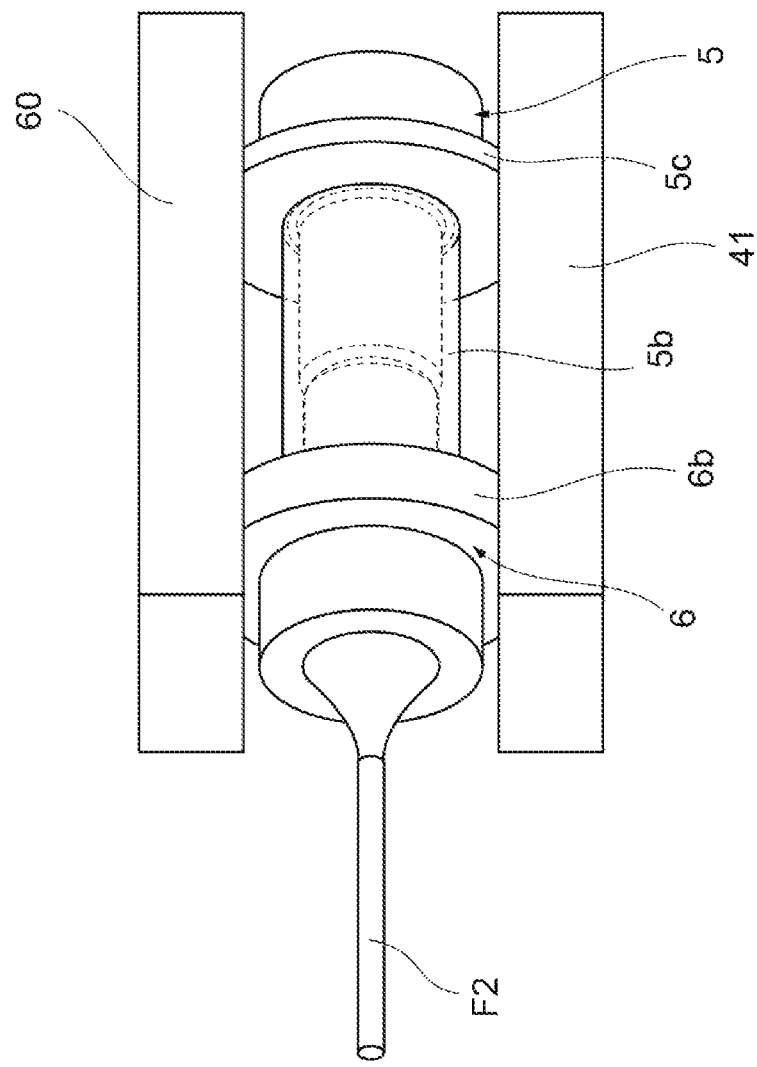
FIG. 14 is a schematic perspective view of a lower plate and the movable retainer of the pressing jig shown in FIG. 10.

Specifically, as shown in FIGS. 13 and 14, when pressure is applied to the clip member 10 by using the jig 30 including the holding part 60 that changes in parallelism, the flange 5c and the flange 6b can be flexibly pressed by the holding part 60 with the receptacle 5 and the plug 6 rigidly supported by the lower plate 41 of the jig 30. Therefore, even when there is a variation in height between the receptacle 5 (flange 5c) and the plug 6 (flange 6b) due to manufacturing tolerances, the variation can be absorbed. Further, the process of applying pressure to the receptacle 5 and the plug 6 from below and to the clip member 10 from above with the jig 30 allows standardization of the attachment of the clip member 10 through the thorough use of the jig 30. Therefore, it is possible to suppress variations in quality of attachment among individuals, which in turn allows standardization of the attachment work and an increase in quality of the attachment work.

As shown in FIGS. 10 and 11, the jig 30 further includes a stopper (for example, the dent 76 of the pressing rod 71 and the ball 73) that stops the holding part 60 from applying pressure when the pressure applied by the holding part 60 becomes equal to or greater than the certain level. Since this stopper is capable of preventing the pressure applied by the holding part 60 from exceeding the certain level, it is possible to suppress damage to each component when, for example, the clip member 10 is attached. Note that the structure of the stopper is not limited to the dent 76 and the ball 73 described above and may be changed as needed.

The jig 30 includes the lower plate 41, the lower plate 41 includes the convex 47 protruding into the space A between the flange 5c of the receptacle 5 and the flange 6b of the plug 6. The convex 47 protrudes between the flange 5c of the receptacle 5 and the flange 6b of the plug 6, allowing the receptacle 5 and the plug 6 to be aligned with each other when the lower plate 41 supports the receptacle 5 and the plug 6. That is, interposing the convex 47 between the flange 5c of the receptacle 5 and the flange 6b of the plug 6 can make the position of the flange 5c and the position of the flange 6b stable.

Further, the holding part 60 may include the base 61 having the cavity S and the support portion 62 movable within the cavity S. In this case, the base 61 having the cavity S and the support portion 62 movable within the cavity S form the holding part 60 that is movable. This in turn can make the structure for changing the parallelism of the pressing surface (the lower surface 66 of the base 61) that applies pressure to the receptacle 5 and the plug 6 simple.

The embodiment of the method for manufacturing an optical component and the pressing jig according to the present disclosure has been described above. However, the method for manufacturing an optical component and the pressing jig according to the present disclosure are not limited to the above-described embodiment, and various modifications are possible. That is, the contents and order of each process under the method for manufacturing an optical component, and the structure of each component of the pressing jig may be changed as needed within the scope of the gist of the claims.

Figure 15:
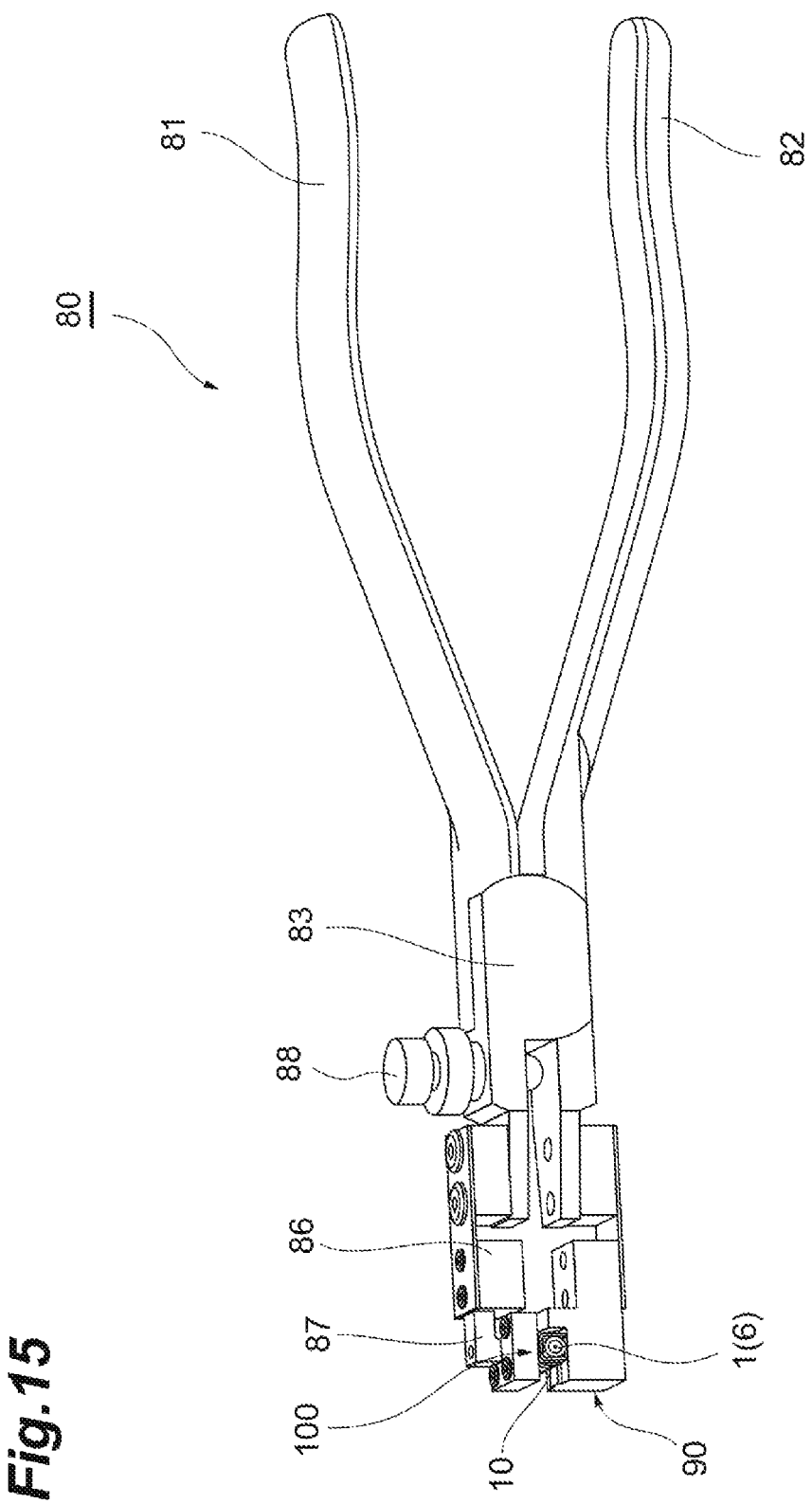
FIG. 15 is a perspective view of a pressing jig according to a modification.
Figure 16:
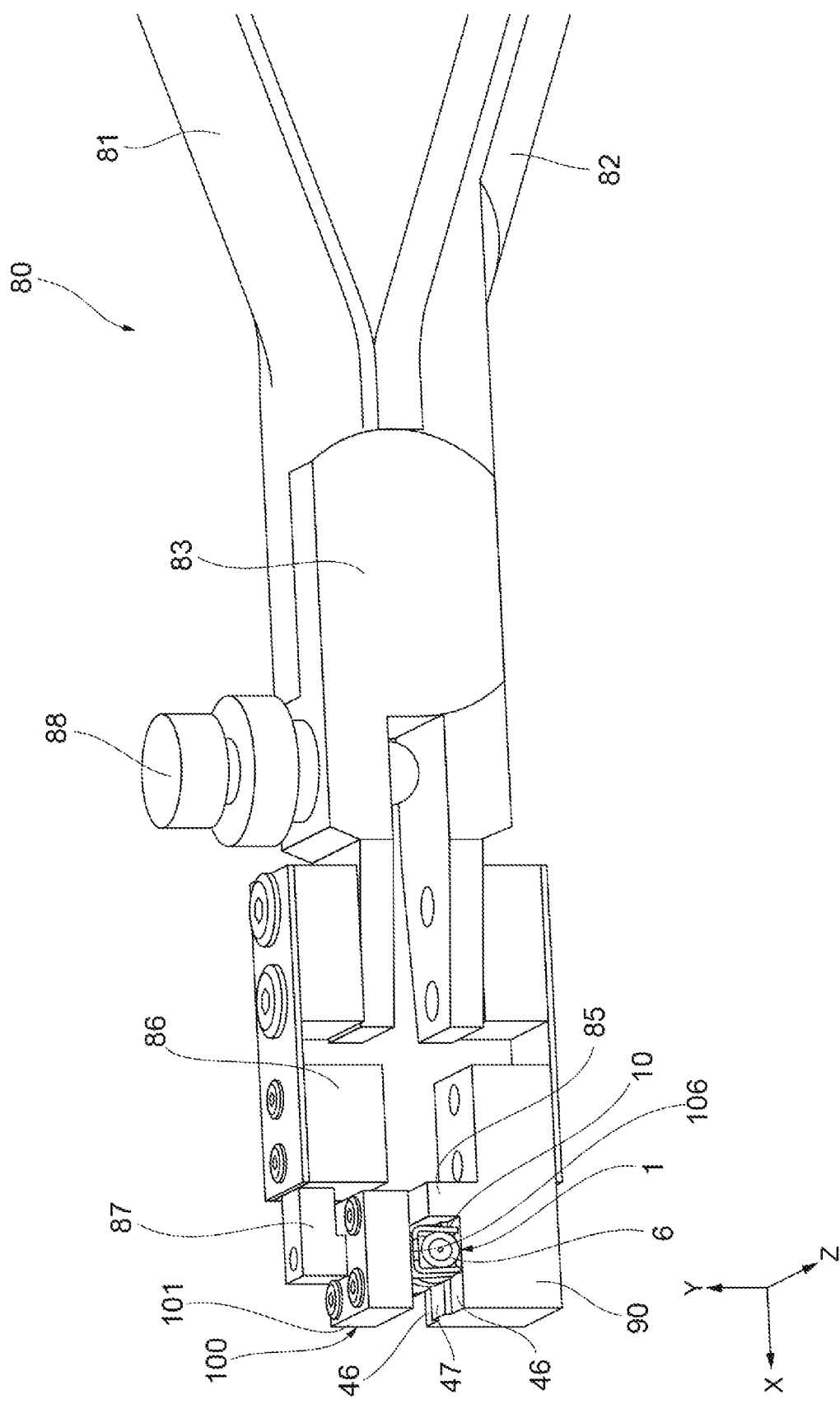
FIG. 16 is a perspective view of a retainer of the pressing jig shown in FIG. 15.

FIGS. 15 and 16 show a jig 80 according to a modification. The jig 80 is a pliers-type pressing jig that is gripped and used by hand. The jig 80 includes a holding portion 90 that holds an optical module 1 placed on the jig 80, a holding part 100 located above the holding portion 90, grips 81, 82 to be gripped by hand, and a movable portion 83 that brings the holding part 100 closer to the holding portion 90 when the grips 81, 82 are gripped. The grips 81, 82 extend from the movable portion 83 toward a side remote from the holding portion 90 and the holding part 100.

For example, a pressure adjuster 88, a first coupling member 86, and a second coupling member 87 are interposed between the movable portion 83 and the holding part 100, and the holding part 100 is attached to a lower end of the second coupling member 87. The pressure adjuster 88 is capable of adjusting the pressure applied by the holding part 100 to the clip member 10. The pressure adjuster 88 serves as a stopper that stops the holding part 100 from applying pressure to the clip member 10 when the pressure becomes equal to or greater than a certain level.

For example, the pressure adjuster 88 is of a rotary type. In this case, rotating the pressure adjuster 88 in one direction increases the upper limit of the pressure applied by the holding part 100, and rotating the pressure adjuster 88 in the opposite direction decreases the upper limit of the pressure applied by the holding part 100. A step portion 85 is located below the holding part 100 and faces the holding part 100, and a side surface of the clip member 10 faces the step portion 85.

The holding portion 90 serves as an aligning portion that aligns the receptacle 5 and the plug 6 of the optical module 1. The holding portion 90 includes a pair of placement surfaces 46 on which the flange 5c of the receptacle 5 and the flange 6b of the plug 6 are placed, and a convex 47 protruding into a space A between the flange 5c and the flange 6b, as with the lower plate 41 of the holding portion 40 described above.

Figure 17:
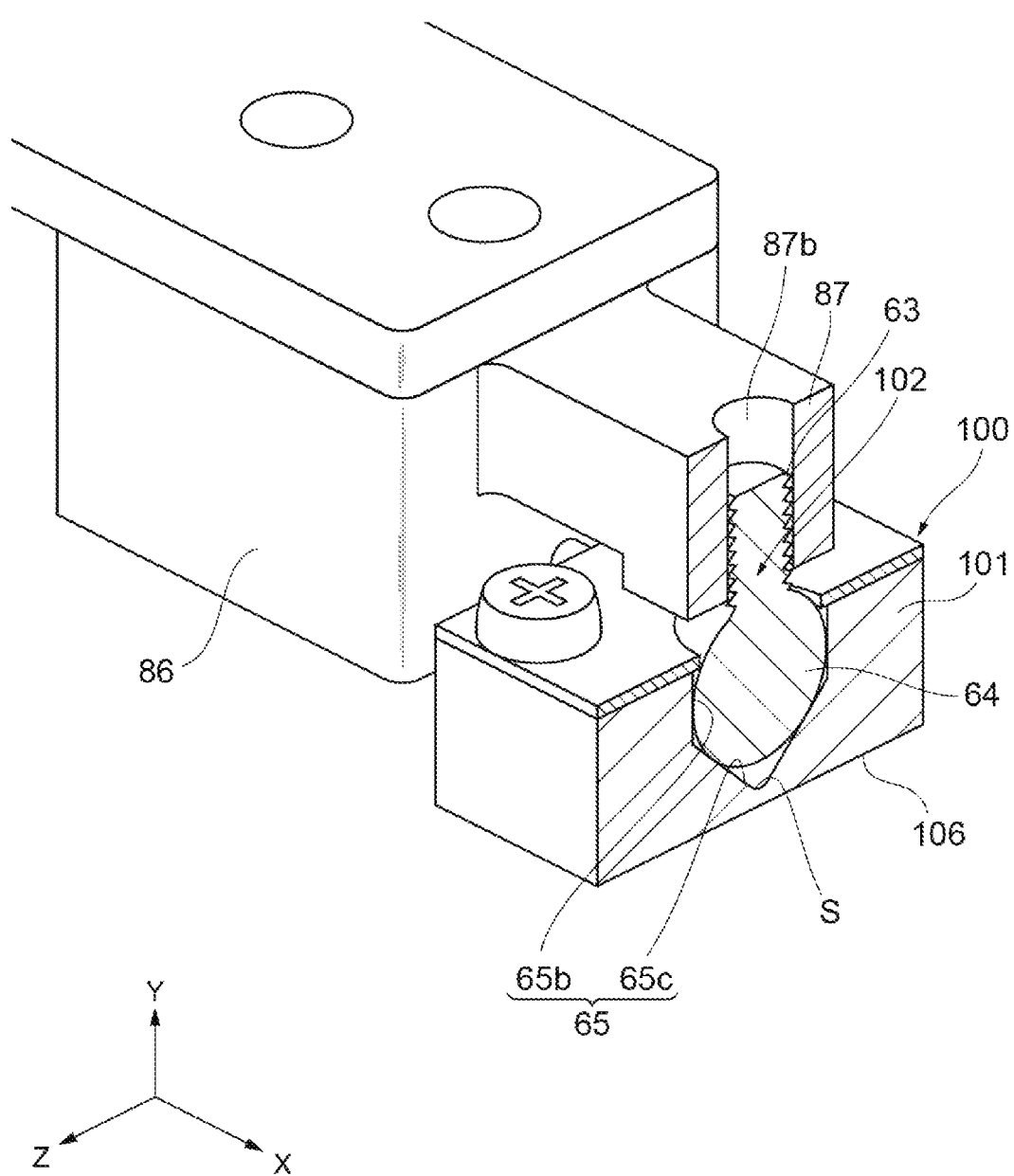
FIG. 17 is a perspective cross-sectional view of a base and a support portion of the retainer shown in FIG. 16.

FIG. 17 is a perspective cross-sectional view of the holding part 100. As shown in FIGS. 16 and 17, the holding part 100 includes a base 101 (pedestal) having a cavity S and a support portion 102 (movable portion) movable within the cavity S. The base 101 and the support portion 102 are, for example, the same in structure as the base 61 and the support portion 62 described above, respectively. The support portion 102 includes, for example, male threads 63 coupled to the second coupling member 87 and a spherical portion 64 located in the cavity S of the base 101. The male threads 63 are fixed with the male threads 63 located in a hole 87b vertically extending through the second coupling member 87.

A lower surface 106 (a surface facing the clip member 10) of the base 101 serves as a pressing surface that applies pressure to the clip member 10. The spherical portion 64 is located in a depressed portion 65 defined by a first inner peripheral surface 65b that forms a cylindrical shape and a second inner peripheral surface 65c that forms a conical shape that gradually reduces in diameter from a lower end of the first inner peripheral surface 65b. The base 101 is tiltable in both the X direction and the Z direction relative to the spherical portion 64.

This makes a structure that makes the holding part 100 (base 101) movable at the lower end of the second coupling member 87. That is, a structure allowing the pressing surface of the holding part 100 (the lower surface 106 of the base 101) that applies pressure to the clip member 10 to change in parallelism is made. Therefore, the jig 80 including the holding part 100 has the same actions and effects as the jig 30 has.

Although the jig 80 has been described above as a modification of the pressing jig, the clip member is not limited to the clip member 10 described above and may be changed as needed. That is, in the above-described embodiment, the clip member 10 including the retainers 12 that are each provided at a corresponding one of the four corners of the plate-shaped portion 11 has been described. However, the position, number, and arrangement of the retainers may be changed as needed. Furthermore, the shape, size, and material of the retainers may be changed as needed.

Further, in the above-described embodiment, the optical module 1 including the receptacle 5 including the stub 5a, the sleeve 5b, the flange 5c, and the cylindrical portion 5d, and the plug 6 including the stub 6a, the flange 6b, and the cylindrical portion 6c has been described. However, the shape, size, and material of the receptacle and the plug may be changed as needed. Further, in the above-described embodiment, the plug has been described as an example of the optical fiber holding member, but the optical fiber holding member may be other than the plug.

Further, in the above-described embodiment, the optical module 1 including the housing 2 and the optical fiber introduction portion 3 has been described. However, the material, size, and shape of the housing and the optical fiber introduction portion may be changed as needed. Furthermore, in the above-described embodiment, the laser module (wavelength tunable laser) has been described as an example, but the type, number, and arrangement mode of optical elements contained in the housing may be changed as needed.

Further, in the above-described embodiment, the coherent laser module, that is, the wavelength tunable laser, contained in the optical transceiver has been described. However, the optical module according to the present disclosure may be a different optical module such as an integrated coherent receiver (ICR), a transmitter optical sub-assembly (TOSA), a receiver optical sub-assembly (ROSA), or a small coherent optical sub-assembly (COSA) that is a module that serves as a multi-level modulator and a receiver and is implemented based on silicon photonics or a transmitter-receiver optical sub-assembly (TROSA).

What is claimed is:

1. A method for fabricating an optical module comprising:
an optical module having a cylindrical receptacle that holds the first optical fiber and has a first flat surface parallel to the optical axis of the first optical fiber as an outer surface;
an optical fiber holding member in a cylindrical shape, that holds a second optical fiber that is optically coupled to the first optical fiber and has a second flat surface parallel to the optical axis of the second optical fiber as an outer surface; and
a clip member having a third flat surface in surface contact with the first flat surface and the second flat surface for aligning the first optical axis with the second optical axis, the clip member being configured to press the receptacle and the optical fiber holding member against each other;
comprising steps of:
preparing the optical module and the optical fiber holding member;
attaching the clip member to the receptacle of the optical module and the optical fiber holding member; and
pressing the receptacle of the optical module and the optical fiber holding member from below and pressing the clip member from above;
wherein the pressing step has pressing the first flat surface of the receptacle and the second flat surface of the optical fiber holding member at the third flat surface of the clip member, and which performed until the first flat surface of the receptacle and the second flat surface of the optical fiber holding member establish parallelism with the third flat surface of the clip member by using a jig that changes the parallelism of the pressing surface.

2. The method for fabricating an optical module to claim 1:
wherein the jig has a lower board inserting the lower board of the jig in a bottom of the receptacle at the optical module and a bottom of the cylindrical shape.

3. The method for fabricating an optical module to claim 2:
wherein putting a fourth flat surface opposite to the first flat surface of the receptacle on one of a mounting side of the lower board and putting a fifth flat surface opposite to the second flat surface of the optical fiber holding member on other of the mounting side of the lower board,
and via a convex provided between the fourth flat surface and the fifth flat surface.

4. A pressing jig comprising:
a lower plate pressing a first flat surface of a receptacle and a second flat surface of an optical fiber holding member;
a holding part includes a movable portion, contacted on a third flat surface of a clip member, that having the third flat surface contact with a fourth flat surface opposite to the first flat surface of the receptacle and a fifth flat surface opposite to the second flat surface of the optical fiber holding member; and
a stopper that stops pressing by the pressing portion when the pressing pressure by the pressing portion exceeds a certain value.

5. The pressing jig according to claim 4:
wherein the lower plate has a convex part between one area of the lower plate contact with the first flat surface of the receptacle and other area of the lower plate contact with the optical fiber holding member.

6. The pressing jig according to claim 5:
wherein the holding part includes a pedestal having a gap and the movable portion that is movable inside the gap.

* * * * *